(12) United States Patent
Cheung et al.

(10) Patent No.: US 8,582,789 B2
(45) Date of Patent: *Nov. 12, 2013

(54) HEARING ENHANCEMENT SYSTEMS

(75) Inventors: Kwok Wai Cheung, Hong Kong (CN);
Peter P. Tong, Mountain View, CA (US);
C. Douglass Thomas, Campbell, CA (US)

(73) Assignee: IpVenture, Inc., Los Altos, CA (US)

( * ) Notice: Subject to any disclaimer, the term of this patent is extended or adjusted under 35 U.S.C. 154(b) by 955 days.

This patent is subject to a terminal disclaimer.

(21) Appl. No.: 12/157,092

(22) Filed: Jun. 6, 2008

(65) Prior Publication Data

US 2008/0279410 A1    Nov. 13, 2008

Related U.S. Application Data

(63) Continuation of application No. 10/826,527, filed on Apr. 15, 2004, now Pat. No. 7,388,962.

(60) Provisional application No. 60/462,570, filed on Apr. 15, 2003, provisional application No. 60/469,221, filed on May 12, 2003, provisional application No. 60/493,441, filed on Aug. 8, 2003.

(51) Int. Cl.
*H04R 25/00* (2006.01)

(52) U.S. Cl.
USPC ............. 381/313; 381/77; 381/381; 381/330; 455/569.1

(58) Field of Classification Search
USPC ............ 455/575.6, 550.1; 381/312, 316, 320, 381/77, 79
See application file for complete search history.

(56) References Cited

U.S. PATENT DOCUMENTS

| 3,942,139 A | 3/1976 | Cooper et al. |
| 3,974,335 A | 8/1976 | Blackledge |
| 4,006,308 A | 2/1977 | Ponsgen |

(Continued)

FOREIGN PATENT DOCUMENTS

| JP | 01109898 A | 4/1989 |
| KR | 2001-0091117 A | 10/2001 |

OTHER PUBLICATIONS

Aoki, K. et al., "Self-demodulation of a plane-wave—Study on primary wave modulation for wideband signal transmission," J. Acoust. Soc. Jpn., pp. 349-356, 1984 (with English abstract).

(Continued)

*Primary Examiner* — Davetta W Goins
*Assistant Examiner* — Phylesha Dabney

(57) ABSTRACT

A hearing enhancement system that enhances a user's hearing is disclosed. For example, the system can include an interface unit that has a directional speaker and a microphone. The microphone captures input audio signals that are transformed into ultrasonic signals. The speaker transmits the ultrasonic signals, which are transformed into output audio signals by interaction with air. At least a portion of the output audio signals are modified to enhance the hearing of the user. Based on the system, the user's ear remains free from any inserted objects and thus is free from annoying occlusion effects. Compared to existing hearing aids, the system is relatively inexpensive. In another embodiment, the system can also be used as a phone. In yet another embodiment, the system can also access audio signals from other portable or non-portable instruments, wired or wirelessly, such as from home entertainment units, phones, microphones at a conference or speakers at a movie theater.

82 Claims, 12 Drawing Sheets

(56) References Cited

U.S. PATENT DOCUMENTS

| | | | |
|---|---|---|---|
| 4,128,738 A | 12/1978 | Gallery |
| 4,292,679 A | 9/1981 | Kondo et al. |
| 4,476,571 A | 10/1984 | Tokumo et al. |
| 4,622,440 A | 11/1986 | Slavin |
| 4,625,318 A | 11/1986 | Snyder |
| 4,823,908 A | 4/1989 | Tanaka |
| 4,955,729 A | 9/1990 | Marx |
| 5,313,663 A | 5/1994 | Norris |
| 5,321,758 A | 6/1994 | Charpentier et al. |
| 5,357,578 A | 10/1994 | Taniishi |
| 5,450,494 A | 9/1995 | Okubo et al. |
| 5,481,616 A | 1/1996 | Freadman |
| 5,495,534 A | 2/1996 | Inanaga et al. |
| 5,526,411 A | 6/1996 | Krieter |
| 5,572,575 A | 11/1996 | Yamamoto et al. |
| 5,588,041 A | 12/1996 | Meyer et al. |
| 5,648,824 A | 7/1997 | Dunn et al. |
| 5,666,424 A | 9/1997 | Fosgate et al. |
| 5,682,157 A | 10/1997 | Asmussen et al. |
| 5,764,595 A | 6/1998 | Power |
| 5,764,782 A | 6/1998 | Hayes |
| 5,777,665 A | 7/1998 | McNelley et al. |
| 5,793,875 A | 8/1998 | Lehr et al. |
| 5,802,190 A | 9/1998 | Ferren |
| 5,819,183 A | 10/1998 | Voroba et al. |
| 5,828,768 A | 10/1998 | Eatwell et al. |
| 5,835,732 A | 11/1998 | Kikinis et al. |
| 5,870,484 A | 2/1999 | Greenberger |
| 5,943,430 A | 8/1999 | Saitoh |
| 6,011,855 A | 1/2000 | Selfridge et al. |
| 6,041,657 A | 3/2000 | Sutherland |
| 6,058,315 A | 5/2000 | Clark |
| 6,086,541 A | 7/2000 | Rho |
| 6,151,398 A | 11/2000 | Norris |
| 6,163,711 A | 12/2000 | Juntunen et al. |
| 6,169,813 B1 | 1/2001 | Richardson et al. |
| 6,243,472 B1 | 6/2001 | Bilan et al. |
| 6,259,731 B1 | 7/2001 | Dent et al. |
| 6,275,596 B1 | 8/2001 | Fretz et al. |
| 6,279,946 B1 | 8/2001 | Johnson et al. |
| 6,322,521 B1 | 11/2001 | Hou |
| 6,363,139 B1 | 3/2002 | Zurek et al. |
| 6,445,804 B1 | 9/2002 | Hirayanagi |
| 6,453,045 B1 | 9/2002 | Zurek et al. |
| 6,477,258 B1 | 11/2002 | Watson et al. |
| 6,484,040 B1 | 11/2002 | Wang |
| 6,496,205 B1 | 12/2002 | White et al. |
| 6,498,970 B2 | 12/2002 | Colmenarez et al. |
| 6,512,826 B1 | 1/2003 | Kim |
| 6,535,612 B1 | 3/2003 | Croft, III et al. |
| 6,556,687 B1 | 4/2003 | Manabe |
| 6,584,205 B1 | 6/2003 | Croft, III et al. |
| 6,591,085 B1 | 7/2003 | Grady |
| 6,594,367 B1 | 7/2003 | Marash et al. |
| 6,631,196 B1 | 10/2003 | Taenzer et al. |
| 6,643,377 B1 | 11/2003 | Takahashi et al. |
| 6,650,755 B2 | 11/2003 | Vaudrey et al. |
| 6,671,494 B1 | 12/2003 | James |
| 6,678,381 B1 | 1/2004 | Manabe |
| 6,895,261 B1 | 5/2005 | Palamidies |
| 7,013,009 B2 | 3/2006 | Warren |
| 7,016,504 B1 | 3/2006 | Shennib |
| 7,269,452 B2 | 9/2007 | Cheung |
| 7,376,236 B1 | 5/2008 | Norris et al. |
| 7,388,962 B2 * | 6/2008 | Cheung et al. ............ 381/381 |
| 7,587,227 B2 | 9/2009 | Cheung et al. |
| 7,801,570 B2 | 9/2010 | Cheung et al. |
| 8,208,970 B2 | 6/2012 | Cheung et al. |
| 2001/0007591 A1 | 7/2001 | Pompei |
| 2001/0038698 A1 | 11/2001 | Breed et al. |
| 2001/0055397 A1 | 12/2001 | Norris et al. |
| 2002/0005777 A1 | 1/2002 | Rodewald et al. |
| 2002/0008718 A1 | 1/2002 | Obradovich |
| 2002/0012441 A1 | 1/2002 | Matsunaga et al. |
| 2002/0048382 A1 | 4/2002 | Hou |
| 2002/0048385 A1 | 4/2002 | Rosenberg |
| 2002/0054689 A1 | 5/2002 | Zhang et al. |
| 2002/0090099 A1 | 7/2002 | Hwang |
| 2002/0090103 A1 | 7/2002 | Calisto, Jr. |
| 2002/0141599 A1 | 10/2002 | Trajkovic et al. |
| 2002/0149705 A1 | 10/2002 | Allen et al. |
| 2002/0183648 A1 | 12/2002 | Hou |
| 2002/0191807 A1 | 12/2002 | Asada et al. |
| 2003/0009248 A1 | 1/2003 | Wiser et al. |
| 2003/0026439 A1 | 2/2003 | Yamamoto et al. |
| 2003/0035552 A1 | 2/2003 | Kolano et al. |
| 2003/0091200 A1 | 5/2003 | Pompei |
| 2003/0092377 A1 | 5/2003 | Hill |
| 2003/0118198 A1 | 6/2003 | Croft, III et al. |
| 2003/0156495 A1 | 8/2003 | Haase et al. |
| 2003/0174242 A1 | 9/2003 | Carmi et al. |
| 2003/0182104 A1 | 9/2003 | Muesch |
| 2004/0052387 A1 | 3/2004 | Norris et al. |
| 2004/0114770 A1 | 6/2004 | Pompei |
| 2004/0114772 A1 | 6/2004 | Zlotnick |
| 2004/0170086 A1 | 9/2004 | Mayer et al. |
| 2004/0202339 A1 | 10/2004 | O'Brien, Jr. et al. |
| 2004/0204168 A1 | 10/2004 | Laurila |
| 2004/0208324 A1 | 10/2004 | Cheung et al. |
| 2004/0208325 A1 * | 10/2004 | Cheung et al. ............ 381/79 |
| 2006/0210090 A1 | 9/2006 | Shennib |
| 2006/0233404 A1 | 10/2006 | Croft et al. |
| 2007/0287516 A1 | 12/2007 | Cheung |
| 2009/0298430 A1 | 12/2009 | Cheung et al. |
| 2011/0103614 A1 | 5/2011 | Cheung et al. |

OTHER PUBLICATIONS

Blackstock, David T., "Audio Application of the Parametric Array," J. Acoust. Soc. Am, vol. 102, No. 5, Pt. 2, Nov. 1997, p. 3106.

Davy, B. A., "Acoustic Self-demodulation of Pre-distorted Pulsed Carriers," Masters Thesis, University of Texas Austin, 1972, title page, pp. i-ix, and 1-57.

Kamakura, T. et al, "Developments of Parametric Loudspeaker for Practical Use", Proceedings of the 10th International Symposium on Nonlinear Acoustics, pp. 147-150, 1984.

Kim, W. et al, "Audio Application of the Parametric Array—Implementation through a Numerical Model," presented at the 113th Convention of the Audio Engineering Society (AES), paper 5652, Oct. 2002, pp. 1-16.

"The Cookie-Size Concert Hall," Business Week, Dec. 2, 1996, 5 pages.

PCT International Search Report, RE: PCT/US04/11972, Jan. 31, 2005.

PCT Written Opinion of the International Searching Authority, RE: PCT/US04/11972, Jan. 31, 2005.

American Technology Corporation, HyperSonic Sound, Jan. 22, 2002, www.atacsd.com.

American Technology Corporation, "Technology Introduction," 2001, pp. 1-19.

American Technology Corporation, "Theory, History, and the Advancement of Parametric Loudspeakers—A Technology Overview," White Paper, 2002, pp. 1-27.

American Technology Corporation, "HSS Directed Audio Sound System, Model Series: 220," Product Information, 2003.

American Technology Corporation;"Technology Licensing—HyperSonic Sound," 2003, pp. 1-3.

Aoki, K. et al., "Parametric Loudspeaker—Applied Examples," Electronics and Communications in Japan, Part 3, vol. 77, No. 1, 1994, pp. 64-74.

Averkiou, M.A. et al., "Self-demodulation of amplitude- and frequency-modulated pulses in a thermoviscous fluid," The Journal of the Acoustical Society of America, 94(5), Nov. 1993, pp. 2876-2883.

Baker, A. C., "Nonlinear pressure fields due to focused circular apertures," The Journal of the Acoustical Society of America, 91(2), Feb. 1992, pp. 713-717.

Bennett, M. B. et al., "Parametric array in air," The Journal of the Acoustical Society of America, vol. 57, No. 3, Mar. 1975, pp. 562-568.

(56) References Cited

OTHER PUBLICATIONS

Berktay, H.O., "Possible Exploitation of Non-Linear Acoustics in Underwater Transmitting Applications," J. Sound Vib. (1965) 2(4), 435-461.

Berntsen, J. et al., "Interaction of sound waves. Part IV: Scattering of sound by sound," The Journal of the Acoustical Society of America, 86(5), Nov. 1989, pp. 1968-1983.

Berntsen, J. et al., "Nearfield of a large acoustic transducer. Part IV: Second harmonic and sum frequency radiation," The Journal of the Acoustical Society of America, 75(5), May 1984, pp. 1383-1391.

Brain, Marshall, How USB Ports Work, Oct. 11, 2002, www.howstuffworks.com/usb.

Darvennes, C. M., et al., "Effects of absorption on the nonlinear interaction of sound beams," The Journal of the Acoustical Society of America, 89(3), Mar. 1991, pp. 1028-1036.

Darvennes, C. M., et al., "Scattering of sound by sound from two Gaussian beams," The Journal of the Acoustical Society of America, 87(5), May 1990, pp. 1955-1964.

Druyvesteyn, W. F., et al., "Personal Sound," J. Audio Eng. Soc., vol. 45, No. 9, Sep. 1997, pp. 685-701.

Garrett, G. et al., "Nearfield of a large acoustic transducer, Part II: Parametric radiation," The Journal of the Acoustical Society of America, 74(3), Sep. 1983, pp. 1013-1020.

Garrett, G., et al., "Nearfield of a large acoustic transducer. Part III: General results," The Journal of the Acoustical Society of America, 75(3), Mar. 1984, pp. 769-779.

Gol'dberg, Z.A., "Certain Second-Order Quantities in Acoustics," SOV Phys Acoust, vol. 3, 1957, pp. 157-162.

Greenspan, M., "Piston radiator: Some extensions of the theory," The Journal of the Acoustical Society of America, 65(3), Mar. 1979, pp. 608-621.

Havelock, D. I., "Directional Loudspeakers Using Sound Beams," J. Audio Eng. Soc., vol. 48, No. 10, Oct. 2000, pp. 908-916.

Holosonic Research Labs, Inc. 2002, "Audio Spotlight—Put sound where you want it," www.holosonics.com/technology.html (downloaded Jan. 18, 2004).

Kamakura, T. et al., "Suitable Modulation of the Carrier Ultrasound for a Parametric Loudspeaker," ACUSTICA, vol. 73 (1991), pp. 215-217.

Kamakura, T. et al., "Harmonic generation in finite amplitude sound beams from a rectangular aperture source," The Journal of the Acoustical Society of America, 91(6), Jun. 1992, pp. 3144-3151.

Kamakura, T., et al., "Nonlinearly generated spectral components in the nearfield of a directive sound source," The Journal of the Acoustical Society of America, 85(6), Jun. 1989, pp. 2331-2337.

Kim, Y.W. et al., "Novel Preprocessing Technique to Improve Harmonic Distortion in Airborne Parametric Array," ICSP '02 Proceedings, pp. 1815-1818.

Kite, T.D., et al., "Parametric Array in Air: Distortion Reduction by Preprocessing," Proceedings of the 16th International Congress on Acoustics and the 135th Meeting of the Acoustical Society of America, Seattle, WA, Jun. 1998, pp. 1091-1092.

Kuznetsov, V. P., "Equations of Nonlinear Acoustics," Soviet Physics-Acoustics, vol. 16, No. 4, Apr.-Jun. 1971, pp. 467-470.

Lawton, B. W., "Damage to human hearing by airborne sound of a very high frequency or ultrasonic frequency," Institute of Sound and Vibration Research, Contract Research Report 343/2001, 2001, pp. 1-77.

Lucas, B. G., et al., "Field of a parametric focusing source," The Journal of the Acoustical Society of America, 73 (6), Jun. 1983, pp. 1966-1971.

Lucas, B. G., et al., "The field of a focusing source, "The Journal of the Acoustical Society of America, 72(4), Oct. 1982, pp. 1289-1296.

Maney, K., "Sound technology turns the way you hear on its ear," USA Today, May 2003, pp. 1-4.

Marculescu, D. et al., "Ready to Ware," IEEE Spectrum, Oct. 2003, pp. 28-32.

Meyer, J., "Microphone Array for Hearing Aids taking into Account the Scattering of the Head," 2001 IEEE Workshop on Applications of Signal Processing to Audio and Acoustics, Oct. 21-24, 2001, pp. 27-30.

Muir, T.G. et al., "Parametric Acoustic Transmitting Arrays," The Journal of the Acoustical Society of America, vol. 52, No. 5, Part 2, 1972, pp. 1481-1486.

Nextel Communications, i60c Phone User's Guide, 2002, pp. 6, 65, 66, 135-137.

Nextel i60c Phone Details, http://nextelonline.nextel.com, downloaded Apr. 22, 2003, pp. 1-2.

Nextel-Direct Connect, http://nextelonline.nextel.com/services/directconnect-popup.html, downloaded Apr. 22, 2003, p. 1.

Palm™ m515 Handheld, Palm Store of Yahoo! Shopping, downloaded Apr. 23, 2003, pp. 1-2.

Palm™ PalmModem® Connectivity Kit, Palm Store of Yahoo! Shopping, downloaded Apr. 23, 2003, pp. 1-2.

Palm™ Tungsten™ C Handheld, Palm Store of Yahoo! Shopping, downloaded Apr. 23, 2003, pp. 1-3.

Palm™ Zire™ 71 Handheld, Palm Store of Yahoo! Shopping, downloaded Apr. 23, 2003, pp. 1-3.

Pompei, F. J., "The Use of Airborne Ultrasonics for Generating Audible Sound Beams," J. Audio Eng. Soc., vol. 47, No. 9, Sep. 1999, pp. 726-731.

Tjotta, J. N. et al., "Propagation and interaction of two collinear finite amplitude sound beams," The Journal of the Acoustical Society of America, 88(6), Dec. 1990, pp. 2859-2870.

Vyas, A. L. et al., "Design Considerations of Parametric Arrays," IEEE Proceedings of the 1998 International Symposium on Underwater Technology, Apr. 15-17, 1998, pp. 98-102.

Westervelt, P.J., "Parametric Acoustic Array," The Journal of the Acoustical Society of America, vol. 35, No. 4, Apr. 1963, pp. 535-537.

Yoneyama, M., et al., "The audio spotlight: An application of nonlinear interaction of sound waves to a new type of loudspeaker design," The Journal of the Acoustical Society of America, 73(5), May 1983, pp. 1532-1536.

Zabolotskaya, E. A., et al., "Quasi-plane Waves in the Nonlinear Acoustics of Confined Beams," Soviet Physics-Acoustics, vol. 15, No. 1, Jul.-Sep. 1969, pp. 35-40.

Zemanek, J. "Beam Behavior within the Nearfield of a Vibrating Piston," The Journal of the Acoustical Society of America, vol. 42, No. 1 (Part 2), 1971, pp. 181-191.

Office Action, re: CN 200480010388.8, Chinese Patent Office, Apr. 17, 2009, 8 pages.

Second Office Action re: CN200480010388.8 Chinese Patent Office, Sep. 4, 2009, 6 pages.

Third Office Action re: CN200480010388.8 Chinese Patent Office, Jan. 22, 2010, 9 pages.

Restriction Requirement for U.S. Appl. No, 10/826,527, dated Mar. 22, 2007.

Office Action for U.S. Appl. No. 10/826,527, dated Jun. 15, 2007.

Notice of Allowance for U.S. Appl. No. 10/826,527, dated Mar. 24, 2008.

Office Action for U.S. Appl. No. 10/826,529, dated Jan. 3, 2007.

Notice of Allowance for U.S. Appl. No. 10/826,529 dated Jun. 12, 2007.

Supplemental Notice of Allowance for U.S. Appl. No. 10/826,529, dated Jul. 30, 2007.

Office Action for U.S. Appl. No. 11/893,835, dated Oct. 21, 2008.

Notice of Allowance for U.S. Appl. No. 11/893,835, dated May 19, 2009.

Supplemental Notice of Allowance for U.S. Appl. No. 11/893,835, dated Jun. 8, 2009.

Supplemental Notice of Allowance for U.S. Appl. No. 11/893,835, dated Jun. 15, 2009.

Office Action for U.S. Appl. No. 12/462,601, dated Nov. 9, 2011.

Notice of Allowance for U.S. Appl. No. 12/462,601, dated Mar. 29, 2012.

Fourth Office Action re: CN200480010388.8 Chinese Patent Office, Jul. 25, 2012, 4 pages.

Fifth Office Action re: CN200480010388.8 Chinese Patent Office, Oct. 26, 2012, 5 pages.

(56) References Cited

OTHER PUBLICATIONS

Notice of Allowance for U.S. Appl. No. 10/826,531, dated May 27, 2010.
Advisory Action for U.S. Appl. No. 10/826,531, dated Dec. 14, 2009.
Advisory Action for U.S. Appl. No. 10/826,531, dated Sep. 15, 2009.
Office Action for U.S. Appl. No. 10/826,531, dated Jul. 9, 2009.
Office Action for U.S. Appl. No. 10/826,531, dated Dec. 31, 2008.
Advisory Action for U.S. Appl. No. 10/826,531, dated Jul. 1, 2008.
Office Action for U.S. Appl. No. 10/826,531, dated Apr. 1, 2008.
Office Action for U.S. Appl. No. 10/826,531, dated Oct. 23, 2007.
Office Action for U.S. Appl. No. 10/826,537, dated Jul. 16, 2010.
Office Action for U.S. Appl. No. 10/826,537, dated Nov. 25, 2009.
Office Action for U.S. Appl. No. 10/826,537, dated Apr. 28, 2009.
Office Action for U.S. Appl. No. 10/826,537, dated Nov. 18, 2008.
Office Action for U.S. Appl. No. 10/826,537, dated May 2, 2008.
Office Action for U.S. Appl. No. 10/826,537, dated Feb. 22, 2008.
Office Action for U.S. Appl. No. 10/826,537, dated Oct. 29, 2007.
Office Action for U.S. Appl. No. 10/826,528, dated Feb. 25, 2009.
Office Action for U.S. Appl. No. 10/826,528, dated Sep. 17, 2008.
Office Action for U.S. Appl. No. 10/826,528, dated May 14, 2008.
Office Action for U.S. Appl. No. 10/826,528, dated Oct. 18, 2007.

* cited by examiner

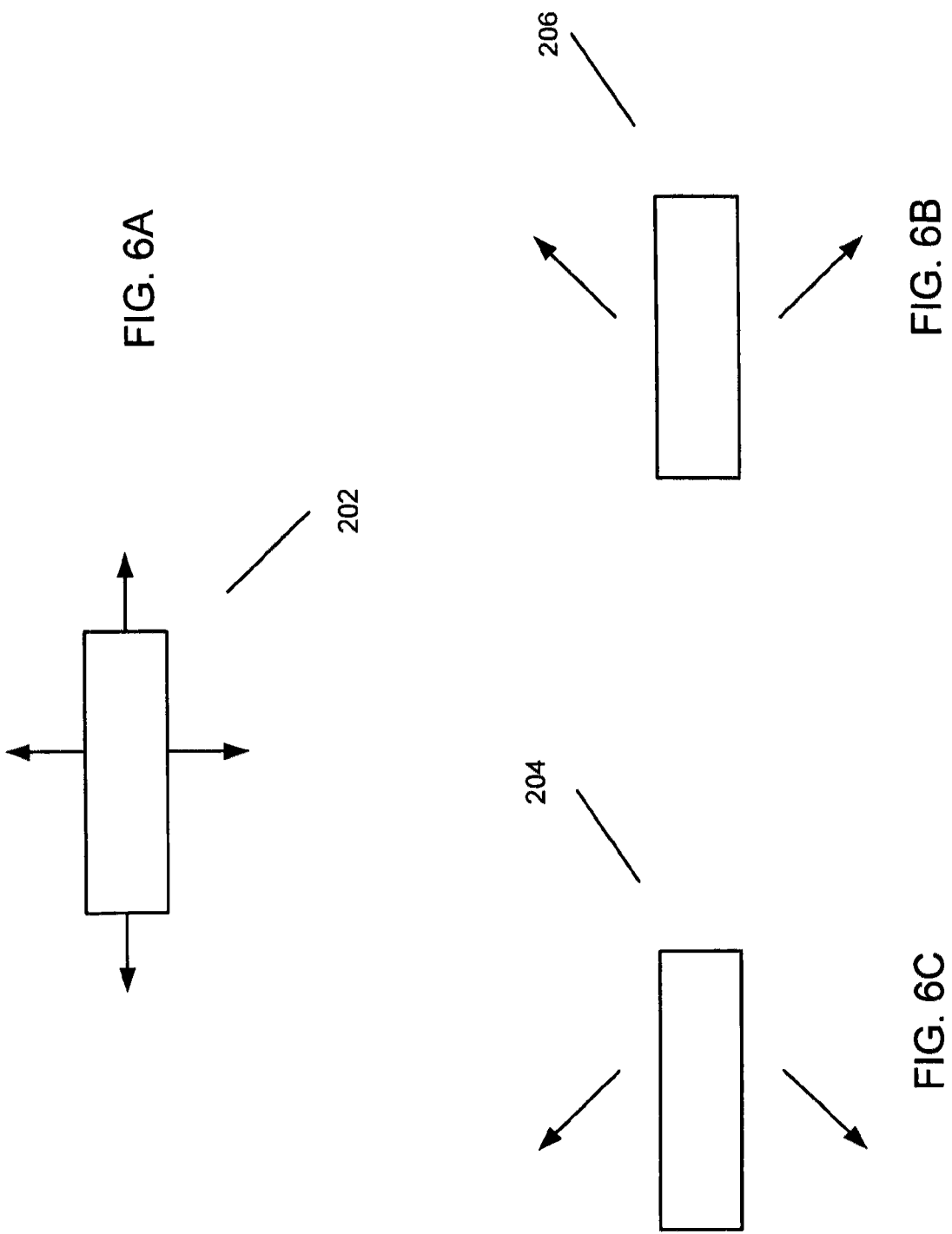

HEARING ENHANCEMENT SYSTEMS

CROSS-REFERENCE TO RELATED APPLICATIONS

This application is a continuation of U.S. patent application Ser. No. 10/826,527, filed Apr. 15, 2004, and entitled "DIRECTIONAL HEARING ENHANCEMENT SYSTEMS," now U.S. Pat. No. 7,388,962, which application claims priority of: (i) U.S. Provisional Patent Application No. 60/462,570, filed Apr. 15, 2003, and entitled "WIRELESS COMMUNICATION SYSTEMS OR DEVICES, HEARING ENHANCEMENT SYSTEMS OR DEVICES, AND METHODS THEREFOR," which is hereby incorporated herein by reference; (ii) U.S. Provisional Patent Application No. 60/469,221, filed May 12, 2003, and entitled "WIRELESS COMMUNICATION SYSTEMS OR DEVICES, HEARING ENHANCEMENT SYSTEMS OR DEVICES, DIRECTIONAL SPEAKER FOR ELECTRONIC DEVICE, PERSONALIZED AUDIO SYSTEMS OR DEVICES, AND METHODS THEREFOR," which is hereby incorporated herein by reference; and (iii) U.S. Provisional Patent Application No. 60/493,441, filed Aug. 8, 2003, and entitled "WIRELESS COMMUNICATION SYSTEMS OR DEVICES, HEARING ENHANCEMENT SYSTEMS OR DEVICES, DIRECTIONAL SPEAKER FOR ELECTRONIC DEVICE, AUDIO SYSTEMS OR DEVICES, WIRELESS AUDIO DELIVERY, AND METHODS THEREFOR," which is hereby incorporated herein by reference.

This application is also related to: (i) U.S. patent application Ser. No. 10/826,529, filed Apr. 15, 2004, now U.S. Pat. No. 7,269,452, and entitled, "DIRECTIONAL WIRELESS COMMUNICATION SYSTEMS," which is hereby incorporated herein by reference; (ii) U.S. patent application Ser. No. 10/826,531, filed Apr. 15, 2004, now U.S. Pat. No. 7,801,570, and entitled, "DIRECTIONAL SPEAKER FOR PORTABLE ELECTRONIC DEVICE," which is hereby incorporated herein by reference; (iii) U.S. patent application Ser. No. 10/826,537, filed Apr. 15, 2004, and entitled, "METHOD AND APPARATUS FOR LOCALIZED DELIVERY OF AUDIO SOUND FOR ENHANCED PRIVACY," which is hereby incorporated herein by reference; and (iv) U.S. patent application Ser. No. 10/826,528, filed Apr. 15, 2004, and entitled, "METHOD AND APPARATUS FOR WIRELESS AUDIO DELIVERY," which is hereby incorporated herein by reference.

BACKGROUND OF THE INVENTION

1. Field of the Invention

The present invention relates generally to a hearing enhancement system, and more particularly, to a hearing enhancement system whose audio signals can be directional.

2. Description of the Related Art

A significant portion of our population has a certain degree of hearing loss. This can be due to, for example, heredity, noise exposure or simply aging. Hearing aids have been the traditional approach to ameliorate hearing difficulties. However, out of the 26 to 28 million people who are hearing impaired in the United States, only about 20% of them actually wear any hearing aids.

One reason people avoid wearing hearing aids is because hearing aids are not inexpensive. Typically, they range from about a thousand US dollars for a pair of analog hearing aids to five thousand US dollars for a pair of digital hearing aids.

Another reason for the lack of wide adoption of hearing aids is that there is still a stigma towards wearing them. People who need hearing aids are known as "hearing impaired." When they go to a dispenser for hearing aids, they are still called "patients." If given a choice, most people do not want others to know that they need hearing aids. As a result, many people with mild or moderate hearing loss do not wear one.

Basically, there are three major types of hearing aids—the "behind-the-ear" (BTE) style, the "in-the-ear" (ITE) style, and the completely-in-the-canal (CIC) style. The BTE hearing aids have a number of advantages. They are more applicable for those with severe hearing loss. Through the use of venting, they reduce to a certain degree the effects of occlusion, which is the hollowness, echoic or stuffed sensation of hearing one's own voice as one talks with a hearing aid inside one's ear. The BTE aids are encapsulated in relatively thick-walled housings. The housing serves to protect components in the hearing aids from harsh conditions due to temperature, sweat, pressure and impact. However, for those wearing hearing aids, they usually prefer a more inconspicuous type, such as an ITE (or CIC) hearing aid, which is located inside the ear canal.

The ITE (or CIC) designs have other benefits. People who use a telephone typically prefer them because they do not require a telephone loop to work with telephone conversations. People who wear glasses usually also prefer them because the hearing aids do not interfere with the arms of the glasses.

On the other hand, just like the BTE, individual ear molds have to be made for the ITE and the CIC hearing aids. The shell of the ITE hearing aid has to be individually configured based on an impression of the patient's canal. Not only is the hearing aid individually formed, a technician, through experience and craftsmanship, has to custom fit the hearing aid into the patient's canal. For a BTE hearing aid, an ear mold that fits the individual's ear canal is also made. This makes the hearing aid a custom product. If a hearing aid is lost or damaged, it is not as easily replaced.

The repair process can be annoying as well. If a user's hearing aid has to be repaired, the process can take a significant amount of time. Except for well-known brands or for manufacturers that offer a worldwide service, repair parts may not be immediately available. Since most hearing aids are still dispensed through local or regional clinics, they may not have the available parts. Though there is usually a loaner's program that allows the user to borrow a BTE aid during this period, the user may have to live, for days or weeks, with a hearing aid that may not feel comfortable.

Another challenge of an ITE (or CIC) hearing aid is in positioning its receiver and microphone because slight misalignment can lead to feedback and resonance.

Users want the ITE (or CIC) hearing aids to be small to make them inconspicuous. However, the inherent small size of the hearing aids brings along its problems. Due to the small size, the walls of its shell are thinner, making them more vulnerable to damage from heat, sweat and abuse than BTE hearing aids. Further, due to its small size and shape, ITE (or CIC) hearing aids are more difficult to handle. For example, sometimes it is cumbersome to switch batteries. And, it is also easier to accidentally drop an ITE (or CIC) aid than a BTE hearing aid. Finally, an ITE (or CIC) hearing aid custom-fits into the user's ear canal. The occlusion effects can be quite disturbing, particularly for the first time hearing aid users.

Hearing tends to decrease gradually. A person with mildly-decreased hearing normally does not need the same degree of hearing assistance as would one with severely-impaired hearing. Nevertheless, such a person could benefit from mild or moderate enhancement to their hearing.

It should be clear from the foregoing that there is still a need for improved techniques to assist those who are hearing impaired.

SUMMARY OF THE INVENTION

In one embodiment, the present invention pertains to a hearing enhancement system that enhances an individual's hearing based on a directional speaker. Many people are mildly or moderately hearing impaired. The decrease in hearing ability may not be to the point where one needs a dedicated, traditional hearing aid. Even so, it would certainly be advantageous to provide some hearing improvement. A number of embodiments in the present invention are particularly suitable for those with mild or moderate hearing loss.

One embodiment of the hearing enhancement system includes an interface unit that has the directional speaker and a microphone. In another embodiment, the system also includes a base unit. A user can wear the system on his clothing, and the speaker can be directed towards an ear of the user when worn.

In one embodiment, the microphone receives audio signals, which are transformed by the system into ultrasonic signals. Then, the directional speaker transmits the ultrasonic signals in air towards an ear of the user. The transmitted signals are transformed back into audio signals by air to form the output audio signals. At least a portion of the output audio signals have higher power with respect to the received audio signals at corresponding frequencies to enhance the hearing of the user.

The directivity of the audio signals is increased due to the ultrasonic signals. In one embodiment, the directivity is further increased by using a phase array of speaker devices. The array can generate the directional audio signals by constructive interference of signals from the individual devices. Based on the array, the direction of the audio signals can be steered by changing the relative phases among the devices.

Typically, the hearing of both ears decreases together. Hence, a user might use two interface units, one for the left and the other for the right ear.

The decrease in hearing may not be uniform across all audio frequencies. As a result, amplifying the received audio signals can be frequency dependent. One approach focuses on amplifying high audio frequencies. Another approach amplifies only a certain band of the audio frequencies. With the lower audio frequencies typically being louder, the band of amplification can be the higher audio frequencies. Since the directional speaker is not attached to or inserted in the ear, the user can still hear the audio signals directly from the audio source. Not only would such an approach eliminate the occlusion effect, with no hearing aid in the ear canal, the natural resonance of the ear canal (typically around 2700 Hz) boosts the audio signal strength in the 2 to 3 kHz ranges. Furthermore, without the hearing aid in the ear canal, there is no insertion loss due to the hearing aid.

In a third approach, the user's hearing is profiled so that frequency amplification is tailored to the user. The user's hearing profile can also be stored in a memory device (such as a removable memory card or stick), which can be inserted into the system. The system can then adjust the amplification of the audio signals across the frequencies based on the user's hearing profile. Frequency-dependent amplification has the added advantage of power conservation because certain audio frequencies may not even need amplification.

A number of embodiments include power management features. One embodiment includes a manual on/off switch allowing the user to turn the system off when desired. In another approach, the system is on-demand. If the signal-to-noise ratio of the incoming audio signals is below a pre-set threshold, the system can be placed in a standby mode (e.g., low power mode).

Another approach that can manage power is to use a directional microphone. This approach can also improve the signal-to-noise ratio. There can be more than one directional microphone, each pointing at a specific direction.

The power level of the output audio signals can also be environment dependent. For example, the power of the output audio signals is increased in a noisier environment. But, as the environment becomes very noisy, the amplification can cease or even be decreased.

The power of the output audio signals can be also increased through different mechanisms. This can be done, for example, by increasing the surface areas of the medium responsible for generating the output audio signals. In embodiments based on ultrasonic transformation, one approach to increase power is to increase the demodulation efficiency. In yet another embodiment, power is increased based on a phase-array of speaker devices, which further increases the directivity of the audio signals. This embodiment has the added advantage of power reduction. With the audio signals more confined, less power is needed to generate the audio signals. In one embodiment, the output audio signals can also be steered to more accurately target the user's ear.

With the ear canal remaining open, the user can still use a phone directly. But, in one embodiment, when there is an incoming phone call, the system changes its mode of operation and functions as a cell phone. If the system is used as a phone, since the audio signals are transmitted in an open environment, people next to the user might pick up the audio signals. Different approaches can be used to improve privacy. The audio signal propagation angle already serves to provide improved privacy. The virtual or physical cone of the audio signals typically propagates from a lower position (elevation) to a higher position towards the ear of the user. With such a propagation direction, signals reflected from the head tend to radiate upward. This reduces the chance of having bystanders eavesdrop on the conversation.

Privacy can be enhanced based on frequency-dependent amplification because certain frequency ranges may not even be amplified. Another approach to improve privacy is to reduce the power of the output audio signals. Yet another approach to enhance privacy is to further increase the directivity of the audio signals.

With the system being used as a phone, the system can have a directional microphone pointing at the head of the user to pick up the user's voice during a phone conversation.

In private, hearing impaired people sometimes might have a tendency to increase the sound level of audio or video instruments a bit too high. On the other hand, in public, hearing impaired people sometimes might have difficulty hearing. In one embodiment, the system is further designed to pick up, capture or access audio signals from a number of portable or non-portable instruments. Audio signals from these instruments can be transmitted through wire to the system. Alternatively, audio signals from these instruments can be transmitted wireless, such as through WiFi or Bluetooth, to the system. The system then converts the wireless signals to audio signals for the user to comfortably listen to the signals. Examples of such instruments include home entertainment units, phones, microphones at a conference, and speakers at a movie theaters.

Other aspects and advantages of the present invention will become apparent from the following detailed description, which, when taken in conjunction with the accompanying drawings, illustrates by way of example the principles of the invention.

BRIEF DESCRIPTION OF THE DRAWINGS

FIGS. 6A-6C show different embodiments regarding microphones for use with the present invention.

Same numerals in FIGS. 1-11 are assigned to similar elements in all the figures. Embodiments of the invention are discussed below with reference to FIGS. 1-11. However, those skilled in the art will readily appreciate that the detailed description given herein with respect to these figures is for explanatory purposes as the invention extends beyond these limited embodiments.

DETAILED DESCRIPTION OF THE INVENTION

The present invention pertains to a hearing enhancement system that enhances an individual's hearing. A number of embodiments in the present invention are particularly suitable for those with mild or moderate hearing loss.

Figure 1:
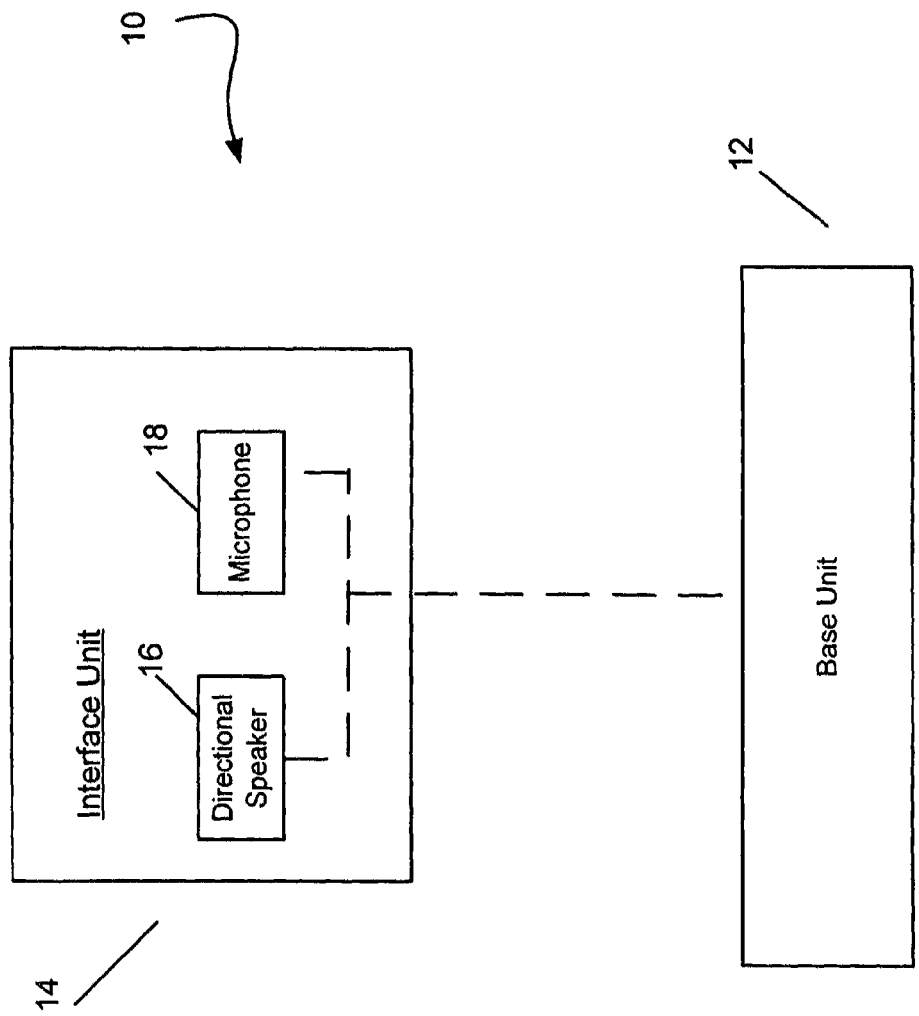
FIG. 1 shows embodiments of the present invention.

FIG. 1 shows one embodiment of a hearing enhancement system 10 of the present invention. The hearing enhancement system 10 includes an interface unit 14, which includes a directional speaker 16 and a microphone 18. The embodiment may also include a base unit 12, which has or, can couple to, a power source. The interface unit 14 can electrically couple to the base unit 12. In one embodiment, the base unit 12 can be integrated within the interface unit 14. The coupling can be in a wired (e.g., cable) or a wireless (e.g., Bluetooth technologies) manner.

Figure 2:
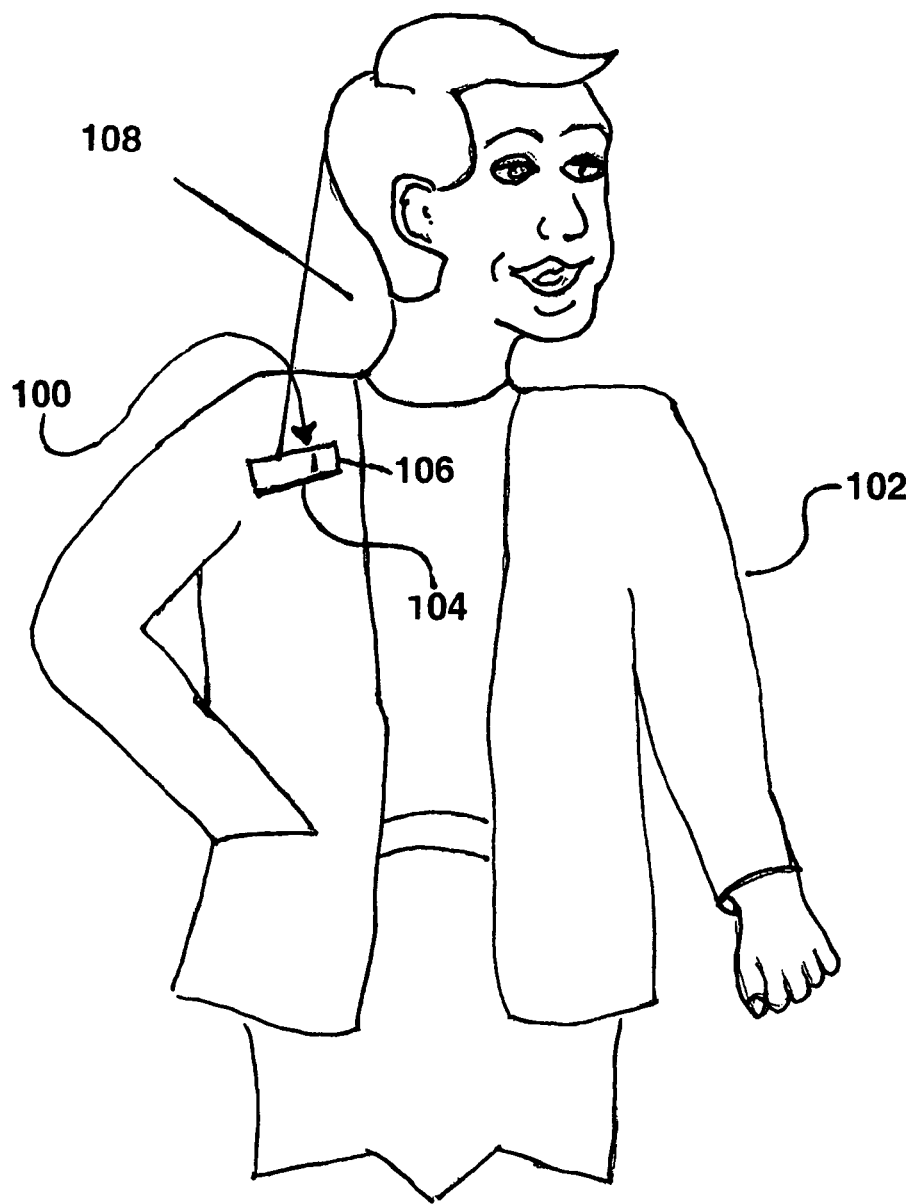
FIG. 2 shows a person wearing one embodiment of the present invention.

FIG. 2 shows a person wearing an interface unit 100 of the present invention on his jacket 102. The interface unit 100 can, for example, be the interface unit 14 shown in FIG. 1. Again, the interface unit 100 includes a directional speaker 104 and a microphone 106. The speaker 104 can be in a line of sight of an ear of the user.

Consider the scenario where a friend is speaking to the user. In one approach, the microphone 106 picks up the friend's speech, namely, her audio signals. A hearing enhancement system according to the invention can then use the audio signals to modulate ultrasound signals. Then, the directional speaker 104 transmits the modulated ultrasonic signals in air towards the ear of the user. The transmitted signals are demodulated in air to create the output audio signals. Based on ultrasound transmission, the speaker 104 generates directional audio signals and sends them as a cone (virtual cone) 108 to the user's ear. In another approach, the directional speaker 104 includes a physical cone or a horn that directly transmits directional audio signals. In yet another approach, the audio signals from the speaker can be steered to the ear or the ear canal, whose location can be identified through mechanisms, such as pattern recognition. Different embodiments of the directional speakers have been described in U.S. patent application Ser. No. 10/826,529, filed Apr. 15, 2004, and entitled "DIRECTIONAL WIRELESS COMMUNICATION SYSTEMS," which is hereby incorporated herein by reference.

Typically, hearing of both ears decreases together. In a sense, this is similar to our need to wear glasses. Rarely would one eye of a person need glasses, while the other eye has 20/20 vision. As a result, there can be two interface units, one for the left ear and another for the right ear. The left ear unit can be on the left shoulder, and the right ear unit can be on the right shoulder. These two interface units can be electrically coupled, or can be coupled to one base unit. Again, the coupling can be wired or wireless. In another approach, the interface unit can be worn by the user as a pendant on a necklace in front of the user. Output audio signals can then be propagated to both ears.

Figure 3:
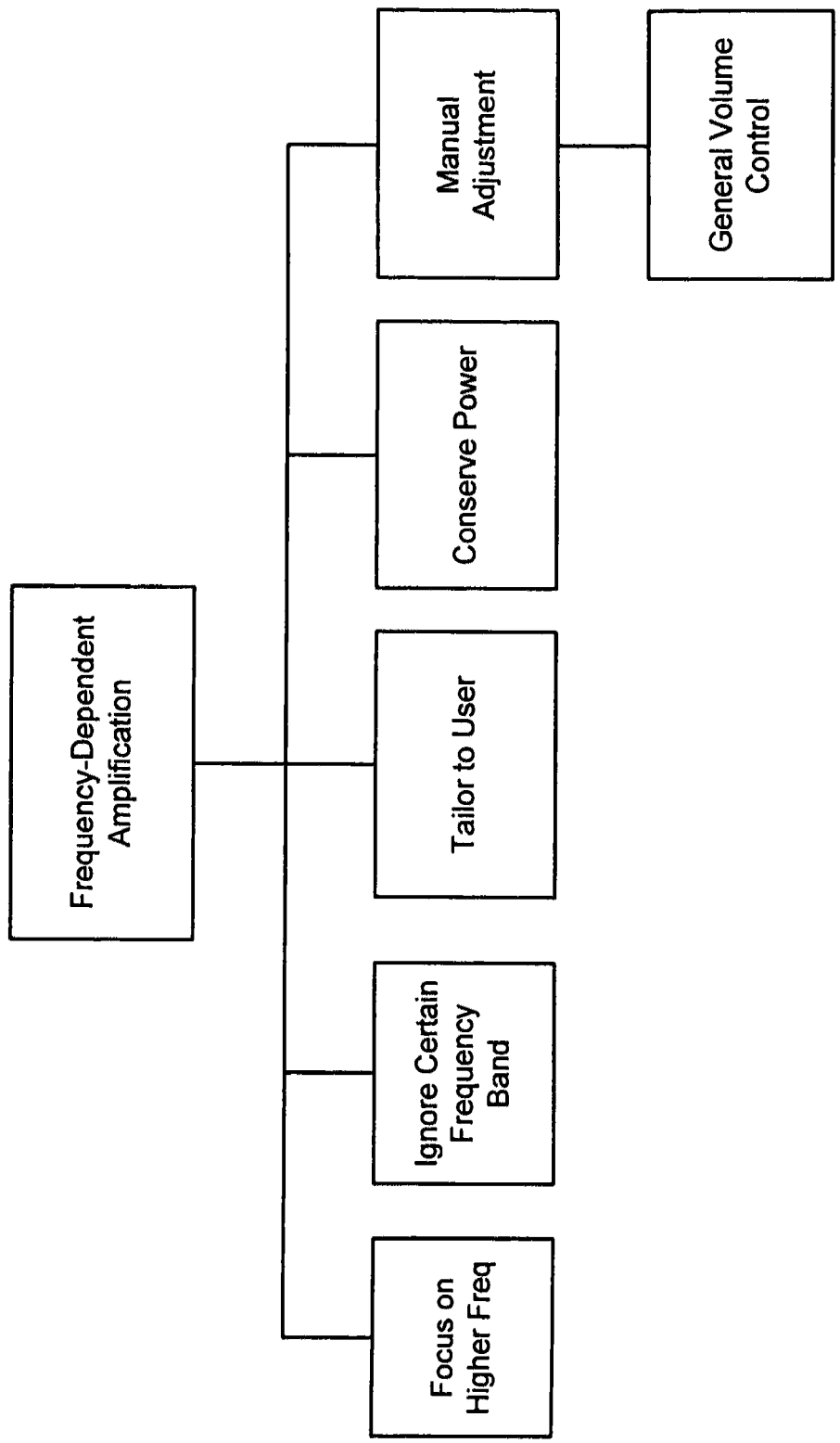
FIG. 3 shows different embodiments regarding frequency-dependent amplification of the present invention.

In one embodiment, the system is designed to operate in the frequency range between 500 Hz to 8 kHz. Typically, a user's hearing impairment is not the same across all audio frequencies. For example, in English, the user might be able to easily pick up the sound of vowels, but not the sound of consonants, such as "S" and "P". FIG. 3 shows different embodiments of the invention regarding frequency-dependent amplification of the received audio signals. Note that amplification is not limited to amplifying the received audio signals directly. For example, in the embodiments using ultrasonic signals to generate output audio signals, amplification can mean the power level of the output audio signals being higher than the received audio signals. This can be through increasing the power of the ultrasonic signals.

One approach for frequency-dependent amplification assumes that the decreased in hearing typically starts at high frequencies, such as above 2 to 3 kHz. So, hearing may need more assistance at the high frequency range. In this approach, one embodiment amplifies the audio signals so that around the entrance of the ear, the signals can have sound pressure level ("SPL") of about 80 dB from 2 kHz to 4 kHz. For frequencies below 2 kHz, the SPL is lower, such as, for frequencies lower than 500 Hz, the maximum SPL can be below 55 dB. In one embodiment, the SPL of the output audio signals can be 70 dB from 1.5 kHz to 4 kHz, and the 3 dB cutoff is also at 1.5 kHz. With a roll off being 12 dB/octave, at 750 Hz, the SPL becomes about 58 dB.

Another frequency-dependent amplification approach assumes that most information in the audio signals resides within a certain frequency band. For example, about 70% of the information in the audio signals can be within the frequency range of 1 to 2 kHz. Since the ear canal remains open and the user may only be mildly or moderately hearing impaired, the user can be hearing the audio signals directly from his sender (i.e., without assistance provided by the hearing enhancement system). In this approach, the system filters audio signals in the identified frequency range, such as the 1 to 2 kHz range, and processes them for amplification and transmission to the user. For frequencies not within the frequency band, they are not processed for amplification. The user can pick them up directly from the sender.

Low to mid frequencies, such as those below 2 kHz, are typically louder. Since the hearing enhancement system does not require having any hearing aid inserted into the ear, the low to mid frequencies can be received at the ear unaltered. Frequencies in the mid to high range, such as from 2000-3000 Hz, will be in the natural resonance of the ear canal, which is typically around 2700 Hz. As a result, these frequencies can be increased by about 15 dB. With no hearing aid inserted into one ear, the audio signals do not experience any insertion loss, and there is also no occlusion effect due to the user's own voice.

In a third approach, amplification across frequencies is directly tailored to the hearing needs of the user. This can be done through calibration. This third approach can also be used in conjunction with either the first approach or the second approach.

Frequency-dependent amplification has the added advantage of power conservation because certain frequency bands may not need or may not have amplification.

In one embodiment, the user has the option of manually changing the amplification of the system. The system can also have a general volume controller that allows the user to adjust the output power of the speaker. This adjustment can also be across certain frequency bands.

Figure 4:
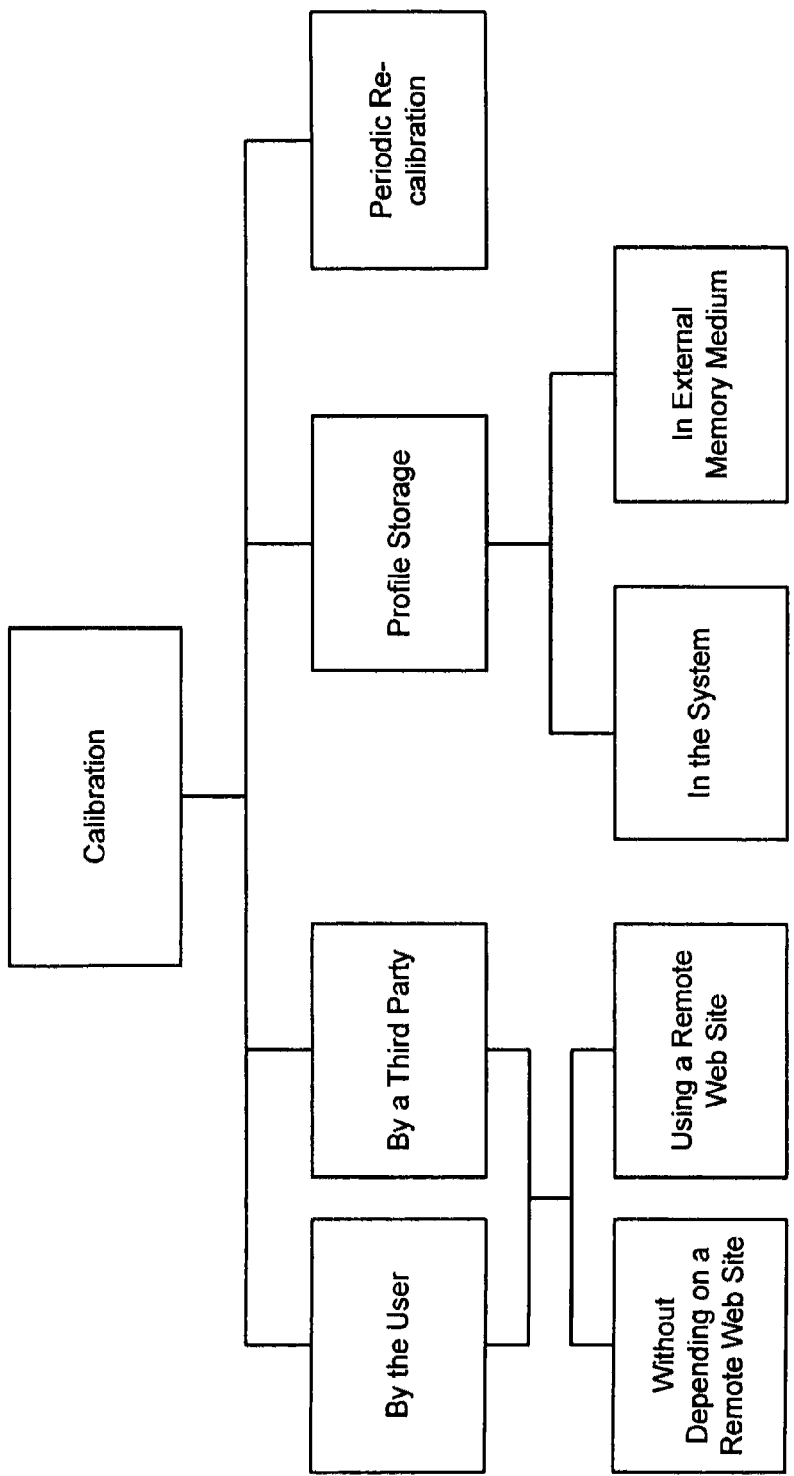
FIG. 4 shows a number of embodiments regarding calibration of the present invention.

FIG. 4 shows a number of embodiments regarding calibration of a user's hearing across various frequencies. Calibration enables the system to determine (e.g., estimate) the hearing sensitivity of the user. Through calibration, the user's hearing profile can be generated. The user can perform calibration by himself. For example, the audio frequencies are separated into different bands. The system generates different SPL at each band to test the user's hearing. The specific power level that the user feels most comfortable would be the power level for that band for the user. After testing is done for all of the bands, based on the power levels for each band, the system creates the user's personal hearing profile. In this calibration process, the system can prompt the user and lead the user through an interactive calibration process.

In another embodiment, calibration can be done remotely through a web site. The web site can guide the user through the calibration process. This can be done, for example, by the user being positioned proximate to a computer terminal that is connected through the Internet to the web site. The terminal has a speaker or headset that produces audio sounds as part of the calibration process.

Instead of the user, this calibration process can also be done by a third party, such as an audiologist.

The user's hearing profile can be stored in the hearing enhancement system. If the calibration is done through a computer terminal, the hearing profile can be downloaded into the hearing enhancement system wirelessly, such as through Bluetooth or infrared technology. The hearing profile can alternatively be stored in a portable media storage device, such as a memory stick. The memory stick could be inserted into the hearing enhancement system, or some other audio generating device, which desires to access the hearing profile and personalizes the system's amplification across frequencies to the user.

The system can also periodically alert the user for re-calibration. The period can be, for example, once a year. The calibration can also be done in stages so that it is less onerous and less obvious that a hearing evaluation is being performed.

Since the ear canal is open, the user can be hearing the audio signals both from the sender and the system. In one embodiment, to prevent echoing effect, signal processing speed of the system cannot be too low. Typically, the user would not be able to distinguish two identical sets of audio signals if the difference in arrival times of the two signals is below a certain delay time, such as 10 milliseconds. In one embodiment, the system's signal processing speed is faster than that the certain delay time. One approach to transform the input audio signals to ultrasonic signals depends on analog signal processing. Another approach to transform the input audio signals to ultrasonic signals depends on digital signal processing.

Figure 5A:
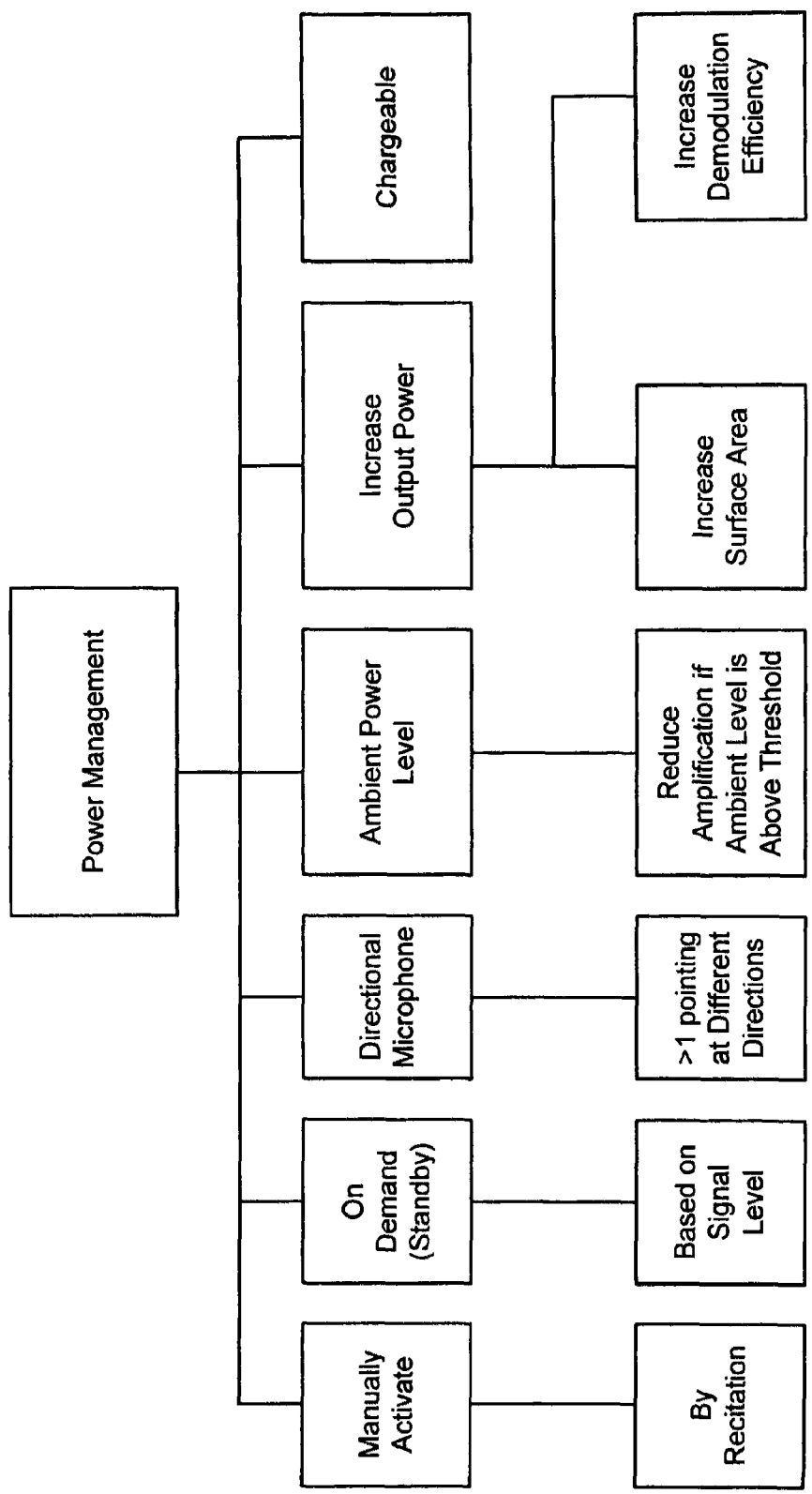
FIG. 5A shows a number of embodiments regarding power management of the present invention.

Since the system might be on continuously for a long duration of time, and can be amplifying across a broad range of the audio frequencies, power consumption can be an issue. FIG. 5A shows a number of embodiments for managing power consumption of the system. One embodiment includes a manual on/off switch, which allows the user to manually turn the system off as he desires. The on/off switch can be on a base unit, an interface unit, or a remote device. This on/off switch can also be voice activated. For example, the system is trained to recognize specific recitation, such as specific sentences or phrases, and/or the user's voice. To illustrate, when the user says sentences like any of the following, the system would be automatically turned on: What did you say? What? Louder. You said what?

The system can be on-demand. In one embodiment, the system can identify noise (e.g., background noise), as opposed to audio signals with information. To illustrate, if the audio signals across broad audio frequency ranges are flat, the system could assume that the input audio signals are noise. In another approach, if the average SPL of the input audio signals is below a certain level, such as 40 dB, the system would assume that there are no audio signals worth amplifying. In any case, when the system recognizes that signals are not to be amplified, the system can then be deactivated, such as to be placed into a sleep mode, a reduced power mode or a standby mode.

With the system operating on-demand, when the sender stops talking for a duration of time, the system can be deactivated. This duration of time can be adjustable, and can be, for example, 10 seconds or 10 minutes. In another approach, only when the signal-to-noise ratio of the audio signals is above a preset threshold would the system be activated (i.e., awakened from the sleep mode, the reduced power mode or the standby mode).

Another approach to manage power consumption can make use of a directional microphone. This approach can improve the signal-to-noise ratio. The gain at specific directions of such a microphone can be 20 dB higher than omni-directional microphones. The direction of the directional microphone can vary with application. However, in one embodiment, the direction of the directional microphone can be pointing forward or outward from the front of the user. The assumption is that the user typically faces the person talking to him, and thus it is the audio signals from the person in front of him that are to be enhanced.

The system, namely, the interface unit, can have more than one directional microphone, each pointing in a different direction. FIG. 6A shows an interface unit 202 with four directional microphones pointing in four orthogonal directions. With the microphones in symmetry, the user does not have to think about the orientation of the microphones if the user is attaching the interface unit to a specific location on his clothing.

FIGS. 6B-6C show interface units 204 and 206, each with two directional microphones pointing in two orthogonal directions. For the two interface units 204 and 206 shown in FIG. 6B-6C, one unit can be on the left shoulder and the other unit on the right shoulder of the user, with the user's head in between the interface units in FIG. 6B and FIG. 6C.

The amplification of the system can also depend on the ambient power level, or the noise level of the environment of the system. One approach to measure the noise level is to measure the average SPL at gaps of the audio signals. For example, a person asks the user the following question, "Did you leave your heart in San Francisco?" Typically, there are gaps between every two words or between sentences or phrases. The system measures, for example, the root mean square ("rms") value of the power in each of the gaps, and can calculate another average among all of the rms values to determine the noise level. In one embodiment, the system increases the gain of the system so as to ensure that the average power of the output audio signals is higher than the noise level by a certain degree. For example, the average SPL of the output audio signals can be 10 dB above the noise level.

In another embodiment, if the average power level of the environment or the ambient noise level is higher than a threshold value, signal amplification is reduced. This average power level can include the audio signals of the person talking to the user. The rationale is that if the environment is very noisy, it would be difficult for the user to hear the audio signals from the other person anyway. As a result, the system should not keep on amplifying the audio signals independent of the environment. For example, if the average power level of the environment is more than 75 dB, the amplification of the system is reduced, such as to 0 dB.

Another power management approach is to increase the power of the audio signals. One embodiment to create more power is to increase the surface area of the medium responsible for generating the output audio signals. For example, if audio signals are generated by a piezoelectric film, one can increase the surface area of the film to increase the power of the signals.

A number of embodiments are based on ultrasonic demodulation or mixing. To increase the output power of such embodiments, one can again increase the surface area of the medium generating the ultrasonic signals. As an example, a 1-cm diameter bimorph can give 140 dB ultrasonic SPL. The device may need about 0.1 W of input power. Ten such devices would increase output power by about 20 dB.

Another approach to increase power is to increase the demodulation or mixing efficiency of the ultrasonic signals by having at least a portion of the transformation performed in a medium other than air. Depending on the medium, this may make the directional speaker more power efficient. Such approaches have been described in the U.S. patent application Ser. No. 10/826,529, now U.S. Pat. No. 7,269,452, entitled, "DIRECTIONAL WIRELESS COMMUNICATION SYSTEMS," filed Apr. 15, 2004.

The system (interface unit and/or the base unit) can include one or more rechargeable batteries. These batteries can be recharged by coupling the system to a battery charger. Another feature of the system that may be provided is one or more electrical connections on the system so as to facilitate electrical connection with a battery charger. For example, when the power source for the system is a rechargeable battery, the ability to charge the battery without removing the battery from the system is advantageous. Hence, in one embodiment, the system includes at least one connector or conductive element (e.g., terminal, pin, pad, trace, etc.) so that the electrical coupling between the rechargeable battery and the charger can be achieved. In this regard, the electrical connector or conductive element is provided on the system and electrically connected to the battery. The placement of the electrical connector or conductive element on the system serves to allow the system to be simply placed within a charger. Consequently, the electrical connector or conductive element can be in electrical contact with a counterpart or corresponding electrical connector or conductive element of the charger.

Figure 5B:
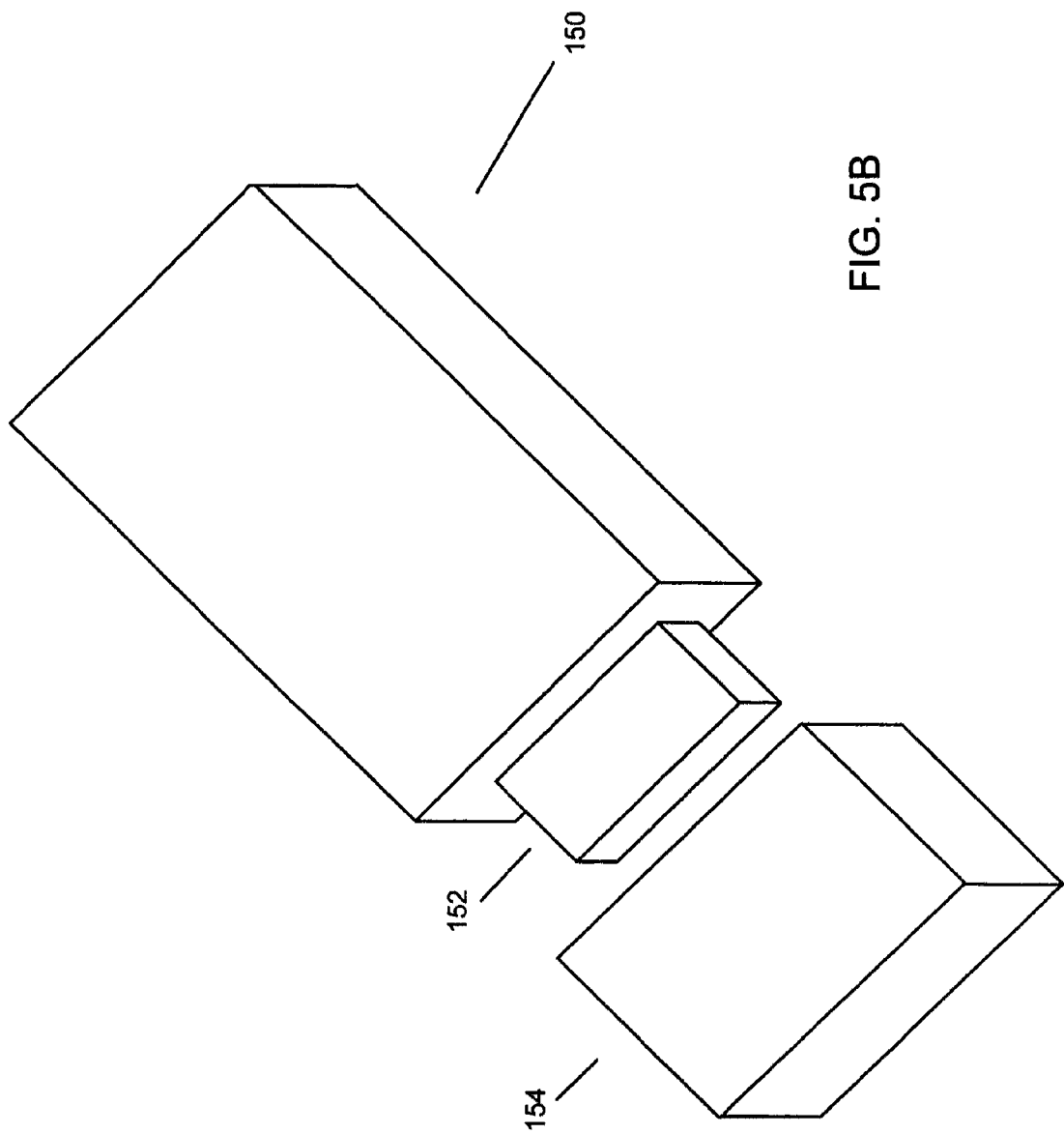
FIG. 5B shows an embodiment of the interface unit with an electrical connection.

FIG. 5B shows an embodiment of the interface unit 150 with an electrical connection 152 and a cover 154. The interface unit 150 can be the interface unit 14 shown in FIG. 1. The electrical connection 152 can be a USB connector. With the cover 154 removed, the connection 152 can be used, for example, to couple to a battery charger to recharge a battery within the interface unit 150.

In one embodiment, the charger can be considered a docking station, upon which the system is docked so that the battery within the system can be charged. Hence, the system can likewise include an electrical connector or conductive element that facilitates electrical connection to the docking station when docked.

Figure 7:
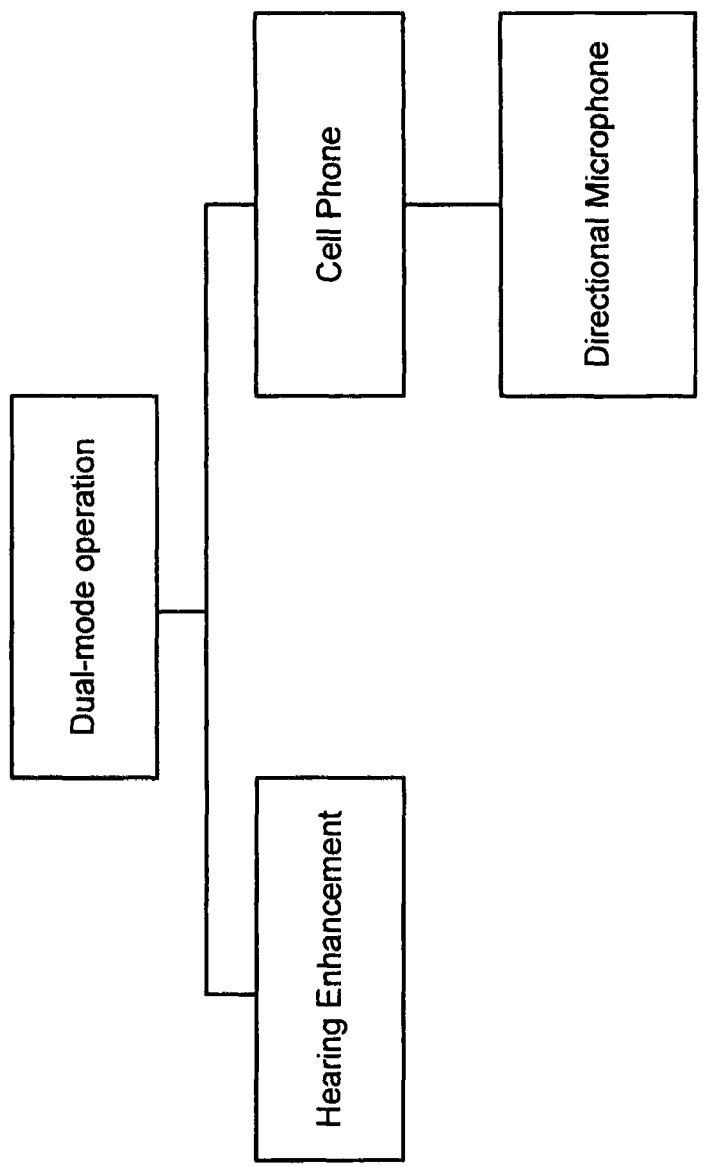
FIG. 7 shows embodiments of the present invention that can also function as a phone.

With the ear canal remaining open, the user can still use a phone directly. However, in one embodiment, the system, which can include the base unit, can also have the electronics to serve as a cell phone. FIG. 7 shows such an embodiment. When there is an incoming phone call, the system can change its mode of operation and function as a cell phone. The system can alert the user of an incoming call. This can be through, for example, ringing, vibration or a blinking light. The user can pick up the call by, for example, pushing a button on the interface unit. Picking up the call can also be through an activation mechanism on the base unit or a remote control device.

Figure 8:
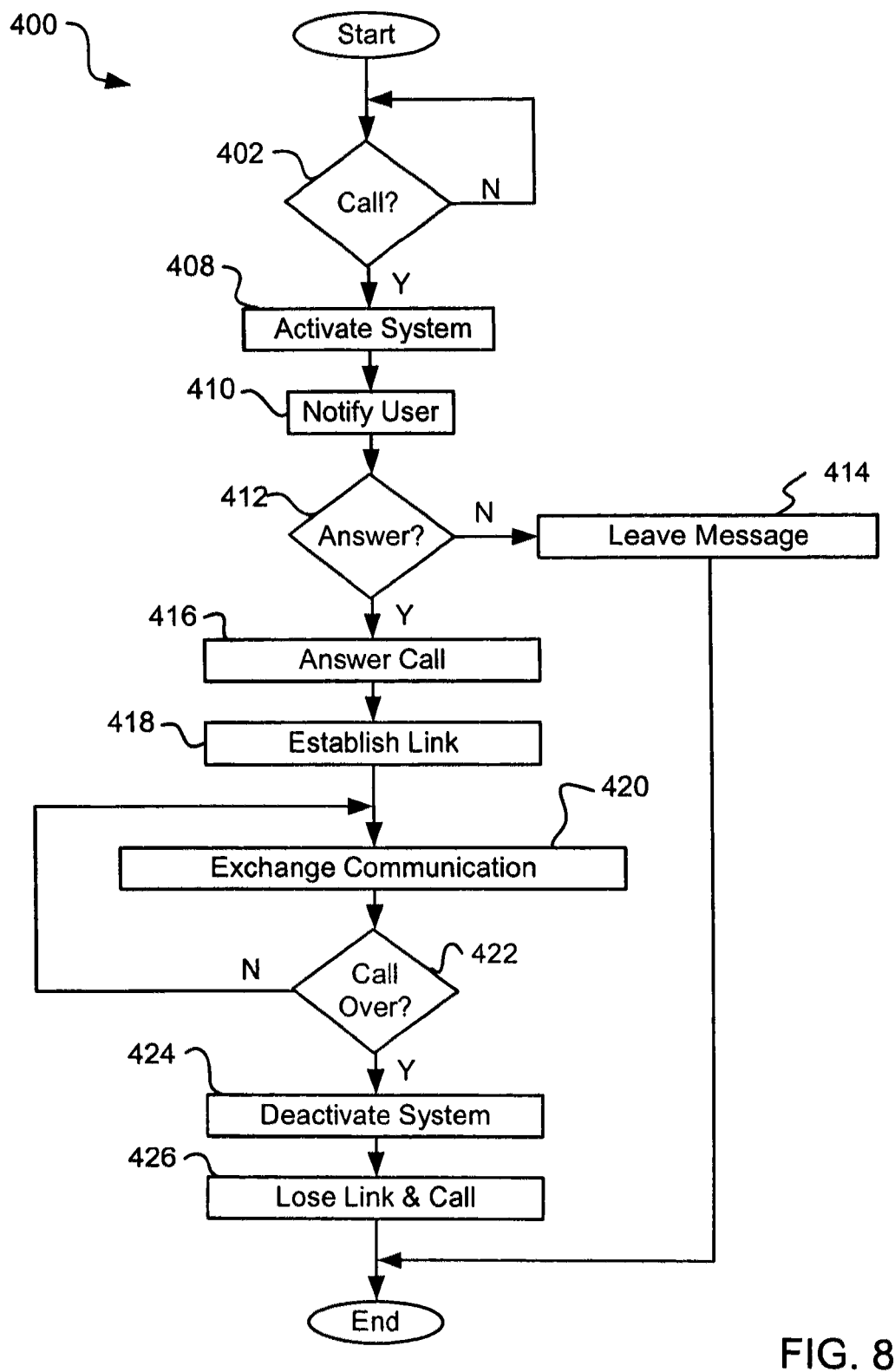
FIG. 8 is a flow diagram of call processing according to one embodiment of the invention.

FIG. 8 is a flow diagram of call processing 400 according to one embodiment of the invention. The call processing 400 is performed using the system. For example, the system can be the system shown in FIG. 1.

The call processing 400 begins with a decision 402 that determines whether a call is incoming. When the decision 402 determines that there is no incoming call, the call processing 400 waits for such a call. Once the decision 402 determines that a call is incoming, the system is activated 408. Here, the wireless communications capability of the system is activated (e.g., powered-up, enabled, or woken-up). The user of the system is then notified 410 of the incoming call. In one embodiment, the notification to the user of the incoming call can be achieved by an audio sound produced by the system (via a speaker). Alternatively, the user of the system could be notified by a vibration of the system, or a visual (e.g., light) indication provided by the system. The base unit could also include a ringer that provides audio sound and/or or vibration indication to signal an incoming call.

Next, a decision 412 determines whether the incoming call has been answered. When the decision 412 determines that the incoming call has not been answered, the base unit can activate 414 a voice message informing the caller to leave a message or instructing the caller as to the unavailability of the recipient.

On the other hand, when the decision 412 determines that the incoming call is to be answered, the call can be answered 416 at the base unit. Then, a wireless link is established 418 between the interface unit and the base unit. The wireless link is, for example, a radio communication link such as utilized with Bluetooth or WiFi networks. Thereafter, communication information associated with the call can be exchanged 420 over the wireless link. Here, the base unit receives the incoming call, and communicates wirelessly with the interface unit such that communication information is provided to the user via the system. The user of the system is accordingly able to communicate with the caller by way of the system and, thus, in a hands-free manner.

A decision 422 then determines whether the call is over (completed). When the decision 422 determines that the call is not over, the call processing 400 returns to repeat the operation 420 and subsequent operations so that the call can continue. On the other hand, when the decision 422 determines that the call is over, then the system is deactivated 424, and the wireless link and the call are ended 426. The deactivation 424 of the system can place the system in a reduced-power mode. For example, the deactivation 424 can power-down, disable, or sleep the wireless communication capabilities (e.g., circuitry) of the system. Following the operation 426, as well as following the operations 406 and 414, the call processing 400 for the particular call ends.

If the system also functions as a phone, the system can have a directional microphone pointing at the head of the user. One such embodiment is shown in FIG. 6A.

Operating the system as a phone can create different concerns as opposed to operating the unit as a hearing enhancement system. Since the audio signals are transmitted in an open environment, people in the user's immediate neighborhood might pick up some of the audio signals. If the SPL is 80 dB when the signals reach the user's head, signals reflected from the head can be 60 dB. Such a level may be heard by people in the immediate vicinity of the user. The user might not want people to pick up what he is hearing. In other words, the user may prefer more privacy.

Figure 9:
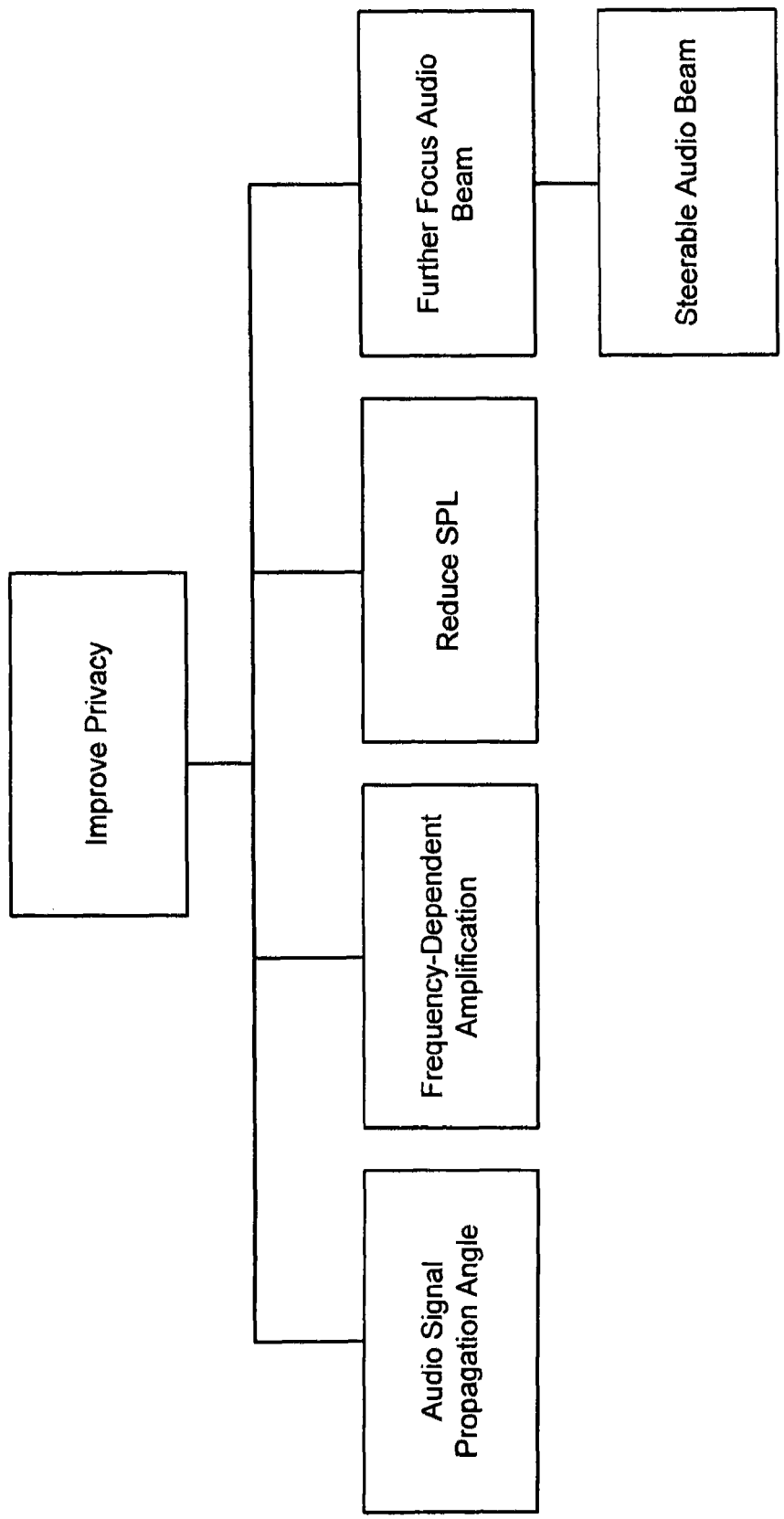
FIG. 9 shows a number of embodiments regarding improving privacy of the present invention.

FIG. 9 shows a number of embodiments regarding improving privacy of the present invention. The audio signal propagation angle can inherently improve privacy. The cone of the audio signals typically propagates from low to high in order to get to an ear of the user. For example, from the user's shoulder to an ear of the user, the elevation angle can be 45 degrees. One advantage of such a propagation direction is that most of the audio signals reflected from the head radiate towards the sky above the head. This reduces the chance of having the audio signals being eavesdropped particularly when the signal power is going down as the square of the propagation distance. Various other propagation directions can be utilized, as discussed in greater detail below.

Privacy can be enhanced based on frequency-dependent amplification. Since certain audio frequencies may not be amplified, and may be relatively low in SPL, their reflected signals can be very low. This reduces the probability of the entire audio signals being heard by others.

Another approach to improve privacy is to reduce the highest power level of the output audio signals to below a certain threshold, such as 70 dB. This level may be sufficient to improve the hearing of those who have mild hearing loss.

Yet another approach to enhance privacy is to further focus the beam of the audio signals. For the embodiment based on transforming ultrasonic frequencies, narrowing the cone can be done, for example, by increasing the carrier frequency of the audio signals. Typically, the higher the carrier frequency, the narrower the cone, such as a cone created by 100 kHz signals typically being narrower than a cone created by 40 kHz signals. Not only can the cone be narrowed, sidelobes can also be suppressed. Another approach to narrow the cone is to increase the gain of the cone or the horn that generates the audio signals.

A focused beam has the added advantage of better power conservation. With the audio signals restricted to a smaller cone, less power is needed to generate the audio signals.

In private, such as at home, hearing impaired people sometimes might have a tendency to increase the sound level of audio or video instruments a bit too high. On the other hand, in public, hearing impaired people sometimes might have difficulty hearing. In one embodiment, the system is further designed to pick up, capture or access audio signals from portable or non-portable instruments, with the interface unit serving as a personalized listening unit.

Audio signals from these instruments can be transmitted through wire to the system. The interface unit can provide an electrical input for connecting to the instrument by wires. If transmission is wireless, the system can be designed to include the electronics to capture wireless signals from the instruments through a wireless local area network, such as WiFi or Bluetooth. The audio signals from these instruments can be up-converted and transmitted as a WiFi signal to be picked up by the system. The system then down-converts the WiFi signal to re-generate the audio signals for the user.

Figure 10:
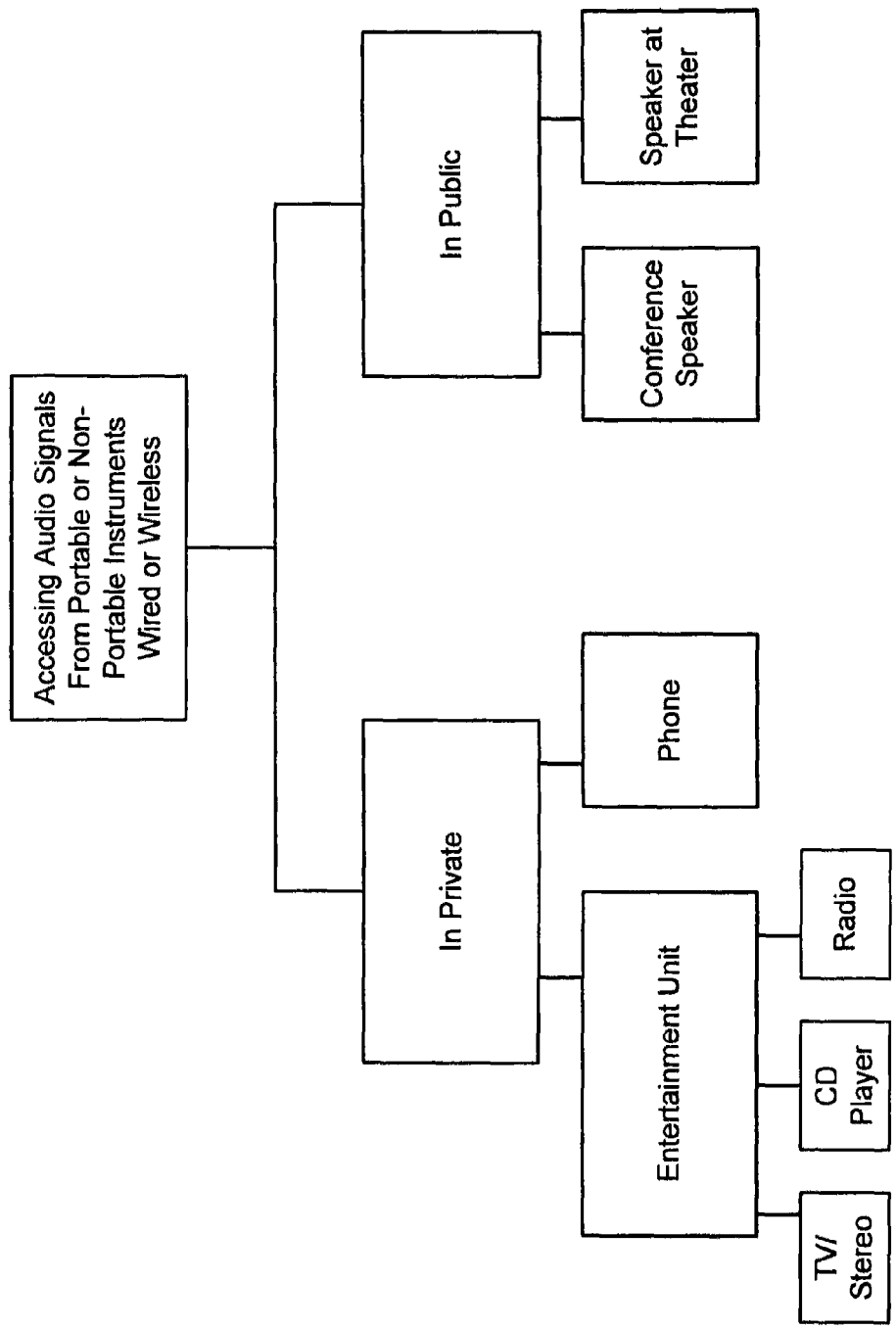
FIG. 10 shows a number of embodiments of the present invention accessing audio signals from other instruments wirelessly or through wired connection.
Figure 11:
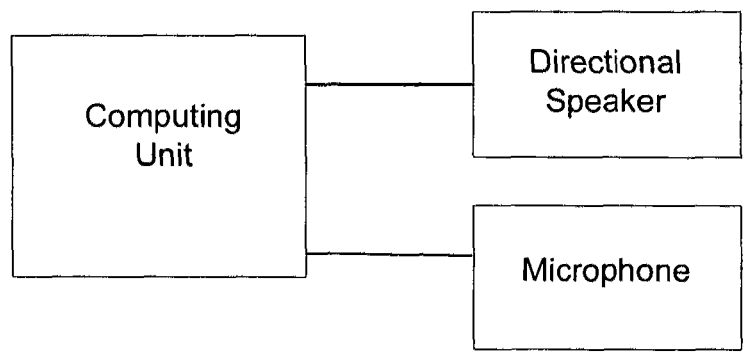
FIG. 11 shows a hearing enhancement system having a computing unit according to one embodiment of the invention.

FIG. 10 shows examples of such other portable or non-portable instruments. The instruments can be used in a private environment, such as at home, or attached to the user. This can include entertainment units, such as televisions, stereo systems, CD players, or radios. As an example, assume the user is working at the backyard and the stereo system is in the living room. Based on this technique, the user can enjoy the music without the need to crank up its volume. Private use can include a phone, which can be a desktop phone with a conference speaker or a cell phone. As yet another example, the system can function as the headset of a phone, and can be coupled to the phone in a wireless manner, such as through WiFi or Bluetooth.

Regarding public use, the user can be at a conference or a theater. The system can be coupled to the conference microphone or the theater speaker wirelessly, and thus be capable of capturing and enhancing the audio signals therefrom.

In a number of embodiments described, the directional speaker generates ultrasonic signals in the range of 40 kHz. One of the reasons to pick such a frequency is for power efficiency. However, to reduce leakage, cross talk or to enhance privacy, in other embodiments, the ultrasonic signals utilized can be between 200 kHz to 1 MHz. It can be generated by multilayer piezoelectric thin films, or other types of solid state devices. Since the carrier frequency is at a higher frequency range than 40 kHz, the absorption/attenuation coefficient by air is considerably higher. On the other hand, privacy is enhanced and audible interference to others is reduced.

A number of embodiments of directional speakers have also been described where the resultant propagation direction of the ultrasonic waves is not orthogonal to the horizontal, but at, for example, 45 degrees. The ultrasonic waves can be at an angle so that the main beam of the waves is approximately pointed at an ear of the user. In another embodiment, the propagation direction of the ultrasonic waves can be approximately orthogonal to the horizontal. Such a speaker does not have to be on a wedge or a step. It can be on a surface that is substantially parallel to the horizontal. For example, the speaker can be on the shoulder of a user, and the ultrasonic waves propagate upwards, instead of at an angle towards an ear of the user. If the ultrasonic power is sufficient, the waves would have sufficient acoustic power even when the speaker is not pointing exactly at the ear.

In one embodiment, the ultrasonic beam is considered directed towards the ear as long as any portion of the beam, or the cone of the beam, is immediately proximate to, such as within 7 cm of, the ear. The direction of the beam does not have to be pointed at the ear. It can even be orthogonal to the ear, such as propagating up from one's shoulder, substantially parallel to the face of the person.

The advantages of the invention are numerous. Different embodiments or implementations may yield different advantages. Different embodiments of the invention can provide one or more of the following advantages: (a) users are provided with non-invasive, hands-free wireless communications capability; (b) the user's ear remains free from any inserted objects and thus is free from the annoying occlusion effects, enabling the user to continue to hear sounds without interference; (c) the system can be inconspicuous due to its relatively small form factor, such as 2" by 3"; (d) the system can be inconspicuous, and would not be seen as a hearing enhancing device because it can be mistaken as a cell phone; (e) the system would not create feedback and resonance due to misalignment in its positioning as in many of the existing hearing aids; (f) the system can have a shape easy to adapt to the profile of a human being, such as in a shape comfortably residing on the shoulder of a user; (g) the system is relatively inexpensive, compared to existing hearing aids—this can, for example, be due to the lack of requiring an individually-fitted ear mold; and (h) the system is relatively easy to handle, such as to change or to recharge batteries, depending on the embodiment.

A number of embodiments have been described where a device is attachable to the clothing worn by a user. In one embodiment, attachable to the clothing worn by a user includes wearable by the user. For example, the user can wear a speaker on his neck, like a pendant on a necklace. This also would be considered as attachable to the clothing worn by the user. From another perspective, the necklace can be considered as the "clothing" worn by the user, and the device is attachable to the necklace.

In one embodiment, signals driving a speaker in a system of the present invention can be modified based upon user information stored in the system. As such, the audio sound being produced by the speaker can be customized for (or personalized to) the user. For example, when the user information pertains to user preferences of the user, the audio output by the speaker is customized for the user preferences of the user.

In one implementation, the measured sound (e.g. noise) levels at the vicinity of a user can be measured by a pickup device (e.g., microphone) at the vicinity of the user. The pickup device can be incorporated in an embodiment of the invention. For example, if the user is in an area with a lot of noise (e.g., ambient noise), such as at a confined space with various persons or where construction noise is present, signals received by the embodiment could be processed to attempt to suppress the unwanted noise. One approach to suppress the unwanted noise is to introduce audio outputs that are opposite in phase to the unwanted noise so as to cancel the noise. Noise suppression can be achieved through conventional digital signal processing, amplification and/or filtering techniques.

One embodiment of the invention includes a mobile telephone 500 with an integrated directional speaker. The mobile telephone is, for example, a cellular phone. The mobile telephone includes a housing that provides an overall body for the mobile telephone. The mobile telephone includes a display. The mobile telephone also includes a plurality of buttons that allow user input of alphanumeric characters or functional requests, and a navigational control that allows directional navigation with respect to the display. To support wireless communications, the mobile telephone also includes an antenna. In addition, the mobile telephone includes a microphone for voice pickup and an ear speaker for audio output. The ear speaker can also be referred to an earpiece.

Additionally, according to the invention, the mobile telephone also includes a directional speaker. The directional speaker provides directional audio sound for the user of the mobile telephone. The directional audio sound produced by the directional speaker allows the user of the mobile telephone to hear the audio sound even though neither of the speaker's ears is proximate to the mobile telephone. However, the directional nature of the directional sound output is towards the user and thus provides privacy by restricting the audio sound to a confined directional area. In other words, bystanders in the vicinity of the user but not within the confined directional area would not be able to directly hear the audio sound produced by the directional speaker. The bystanders might be able to hear a degraded version of the audio sound after it reflects from a surface. The reflected audio sound, if any, that reaches the bystander would be at a reduced decibel level (e.g., at least a 20 dB reduction) making it difficult for bystanders to hear and understand the audio sound.

Another embodiment of the invention includes a flip-type mobile telephone 510 with an integrated directional speaker. The mobile telephone 510 is, for example, a cellular phone. The mobile telephone 510 is similar to the mobile telephone 500. More particularly, the mobile telephone 510 includes a housing that provides a body for the mobile telephone 510. The mobile telephone 510 includes a display, a plurality of keys, and a navigation control. To support wireless communications, the mobile telephone 510 also includes an antenna. In addition, the mobile telephone 510 includes a microphone for voice pickup and an ear speaker for audio output.

Moreover, according to the invention, the mobile telephone 510 includes a directional speaker. In this embodiment, the directional speaker is provided in a lower region of a lid portion of the housing of the mobile telephone 510. The directional speaker directs audio output to the user of the mobile telephone 510 in a directional manner. The directional nature of the directional sound output is towards the user and thus provides privacy by restricting the audio sound to a confined directional area.

The various embodiments, implementations and features of the invention noted above can be combined in various ways or used separately. Those skilled in the art will understand from the description that the invention can be equally applied to or used in other various different settings with respect to various combinations, embodiments, implementations or features provided in the description herein.

The invention can be implemented in software, hardware or a combination of hardware and software. A number of embodiments of the invention can also be embodied as computer readable code on a computer readable medium. The computer readable medium is any data storage device that can store data, which can thereafter be read by a computer system. Examples of the computer readable medium include read-only memory, random-access memory, CD-ROMs, magnetic tape, optical data storage devices, and carrier waves. The computer readable medium can also be distributed over network-coupled computer systems so that the computer readable code is stored and executed in a distributed fashion.

Numerous specific details are set forth in order to provide a thorough understanding of the invention. However, it will be understood by those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

Also, in this specification, reference to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

What is claimed is:

1. A hearing enhancement system for a user, comprising:
    an audio system configured to receive input signals for broadcasting, and configured to up-convert the received input signals into up-converted signals to be wirelessly transmitted;
    a wireless receiver configured to wirelessly receive the up-converted signals;
    a down-converter configured to down-convert the received up-converted signals into down-converted signals;
    a modifier configured to modify the down-converted signals into modified signals based on at least one hearing characteristic of the user to enhance the hearing of the user; and
    a speaker configured to generate audio output signals from the modified signals for the user.

2. A hearing enhancement system as recited in claim 1, wherein the up-converted signals are in the WiFi frequency band.

3. A hearing enhancement system as recited in claim 1, wherein the audio system is selected from the list consisting a television, a stereo system, a CD player and a radio.

4. A hearing enhancement system as recited in claim 1, wherein the audio system is a phone.

5. A hearing enhancement system as recited in claim 1, wherein the audio system receives the input signals from a microphone.

6. A hearing enhancement system as recited in claim 1, wherein the down-converted signals are modified such that a portion of the audio output signals has an increased power to enhance the hearing of the user.

7. A hearing enhancement system as recited in claim 6,
    wherein the portion with increased power is selected based on frequency, and
    wherein a higher frequency portion has increased power.

8. A hearing enhancement system as recited in claim 1,
    wherein the at least one hearing characteristic of the user is determined via calibrating the user's hearing,
    wherein the power of the audio output signals can be changed as a function of frequency, and
    wherein the user can change the power of the audio output signals.

9. A hearing enhancement system as recited in claim 1, wherein the speaker is configured to generate ultrasonic signals, with at least a portion of the ultrasonic signals transformed into the audio output signals in air.

10. A hearing enhancement system as recited in claim 1, wherein the speaker is a directional speaker.

11. A hearing enhancement system as recited in claim 1, wherein the speaker is an ear speaker.

12. A hearing enhancement system as recited in claim 1, wherein the speaker is in a headset.

13. A hearing enhancement apparatus for a user, the apparatus being wirelessly coupled to an audio system, which is configured to up-convert input signals into up-converted signals to be wirelessly transmitted, the apparatus comprising:
    a wireless receiver configured to wirelessly receive the up-converted signals;
    a down-converter configured to down-convert the received up-converted signals into down-converted signals;
    a modifier configured to modify the down-converted signals into modified signals based on at least one hearing characteristic of the user to enhance the hearing of the user; and
    a speaker configured to generate audio output signals from the modified signals for the user.

14. A hearing enhancement apparatus as recited in claim 13, wherein the down-converted signals are modified such that a portion of the audio output signals has an increased power to enhance the hearing of the user.

15. A hearing enhancement apparatus as recited in claim 14,
    wherein the portion with the increased power is selected based on frequency,
    wherein a higher frequency portion has increased power,
    wherein the at least one hearing characteristic of the user is determined via calibrating the user's hearing,
    wherein the power of the audio output signals can be changed as a function of frequency, and
    wherein the user can change the power of the audio output signals.

16. A hearing enhancement apparatus as recited in claim 15, wherein the down-converted signals are further modified based on the noise level of the environment of the apparatus.

17. A hearing enhancement apparatus as recited in claim 16, wherein the apparatus is also configured to operate as at least a part of a phone.

18. A hearing enhancement apparatus as recited in claim 14,
    wherein the portion with increased power is selected based on frequency, and
    wherein a higher frequency portion has increased power.

19. A hearing enhancement apparatus as recited in claim 13, wherein the up-converted signals are in the WiFi frequency band.

20. A hearing enhancement apparatus as recited in claim 13,
    wherein the at least one hearing characteristic of the user is determined via calibrating the user's hearing,
    wherein the power of the audio output signals can be changed as a function of frequency, and
    wherein the user can change the power of the audio output signals.

21. A hearing enhancement apparatus as recited in claim 13, wherein the speaker is configured to generate ultrasonic signals, with at least a portion of the ultrasonic signals transformed into the audio output signals in air.

22. A hearing enhancement apparatus as recited in claim 13, wherein the down-converted signals are further modified based on the noise level of the environment of the apparatus.

23. A hearing enhancement apparatus as recited in claim 13, wherein the apparatus is also configured to operate as a phone.

24. A hearing enhancement apparatus as recited in claim 13, wherein the at least one hearing characteristic of the user is wirelessly received and stored in the hearing enhancement apparatus.

25. A hearing enhancement apparatus as recited in claim 13, wherein the at least one hearing characteristic of the user is retrieved from a portable media storage device while being physically in contact with the apparatus.

26. A hearing enhancement apparatus as recited in claim 13, wherein the speaker is a directional speaker.

27. A hearing enhancement apparatus as recited in claim 13, wherein the speaker is an ear speaker.

28. A hearing enhancement apparatus as recited in claim 13, wherein the speaker is in a headset.

29. A hearing enhancement apparatus as recited in claim 13,
wherein the audio system is configured to operate as a phone,
wherein the hearing enhancement apparatus is configured to operate in conjunction with or at least as a part of a mobile phone,
wherein the speaker is an ear speaker, and
wherein to enhance the hearing of the user, the modifier is configured to modify the down-converted signals into modified signals at one or more frequencies within the audio frequencies, with the one or more frequencies being determined by the at least one hearing characteristic of the user.

30. A hearing enhancement apparatus as recited in claim 29,
wherein the at least one hearing characteristic of the user is determined via calibrating the user's hearing at least across the one or more frequencies to generate at least a portion of the hearing profile of the user, and
wherein the hearing profile is stored in the hearing enhancement apparatus.

31. A hearing enhancement apparatus as recited in claim 30, wherein the hearing enhancement apparatus allows the user to calibrate the user's hearing via a computing device.

32. A hearing enhancement apparatus as recited in claim 30, wherein the hearing enhancement apparatus is configured to periodically remind the user to calibrate the user's hearing.

33. A hearing enhancement apparatus as recited in claim 30, wherein at least a portion of the at least one hearing characteristic of the user is wirelessly received by and stored in the hearing enhancement apparatus.

34. A hearing enhancement apparatus as recited in claim 33, wherein the hearing enhancement apparatus is a headset.

35. A hearing enhancement apparatus as recited in claim 33, wherein the hearing enhancement apparatus is a computing device that is wearable.

36. A hearing enhancement apparatus as recited in claim 33, wherein the hearing enhancement apparatus is a mobile phone.

37. A hearing enhancement apparatus as recited in claim 36, wherein the hearing enhancement apparatus is configured to periodically remind the user to calibrate the user's hearing.

38. A hearing enhancement apparatus as recited in claim 36, wherein the hearing enhancement apparatus includes a user control configured to allow the user to control the power of the audio output signals on a plurality of frequency bands across the audio frequencies.

39. A hearing enhancement apparatus as recited in claim 29, wherein at least a portion of the at least one hearing characteristic is wirelessly received by and stored in the hearing enhancement apparatus.

40. A hearing enhancement apparatus as recited in claim 39, wherein the hearing enhancement apparatus is a headset.

41. A hearing enhancement apparatus as recited in claim 39, wherein the hearing enhancement apparatus is a computing device that is wearable.

42. A hearing enhancement apparatus as recited in claim 39, wherein the hearing enhancement apparatus is a mobile phone.

43. A hearing enhancement apparatus as recited in claim 29, wherein the hearing enhancement apparatus is configured to alter a power level of the audio output signals based on a noise level of the environment of the apparatus.

44. A hearing enhancement apparatus as recited in claim 43,
wherein the hearing enhancement apparatus is configured to increase the power of the audio output signals as the noise level increases, and
wherein the hearing enhancement apparatus is configured not to further increase the power of the audio output signals if the noise level is beyond a certain predetermined threshold.

45. A hearing enhancement apparatus as recited in claim 29, wherein the apparatus includes a volume control that is configured to respond to a voice command of the user.

46. A hearing enhancement apparatus as recited in claim 13, wherein the hearing enhancement apparatus is a headset.

47. A hearing enhancement apparatus as recited in claim 46, wherein the speaker is an ear speaker.

48. A hearing enhancement apparatus as recited in claim 47, wherein the audio output signals are changed in view of a preference of the user stored in the apparatus.

49. A hearing enhancement apparatus as recited in claim 48, wherein the audio output signals are changed based on audio sound in the environment of the apparatus.

50. A hearing enhancement apparatus as recited in claim 49 further comprising a microphone at least for receiving the audio sound in the environment of the apparatus.

51. A hearing enhancement apparatus as recited in claim 50, wherein the microphone is a directional microphone.

52. A hearing enhancement apparatus as recited in claim 46, wherein the audio output signals are changed in view of a preference of the user stored in the apparatus.

53. A hearing enhancement apparatus as recited in claim 46, wherein the audio output signals are changed based on audio sound in the environment of the apparatus.

54. A hearing enhancement apparatus as recited in claim 53 further comprising a microphone at least for receiving the audio sound in the environment of the apparatus.

55. A hearing enhancement apparatus as recited in claim 13, wherein the hearing enhancement apparatus is a mobile phone.

56. A hearing enhancement apparatus as recited in claim 55, wherein the audio output signals are modified in view of a preference of the user stored in the apparatus.

57. A hearing enhancement apparatus as recited in claim 56, wherein the audio output signals are modified based on audio sound in the environment of the apparatus.

58. A hearing enhancement apparatus as recited in claim 57 further comprising a microphone at least for receiving the audio sound in the environment of the apparatus.

59. A hearing enhancement apparatus as recited in claim 58, wherein the microphone is a directional microphone.

60. A hearing enhancement apparatus as recited in claim 55, wherein the audio output signals are modified based on audio sound in the environment of the apparatus.

61. A hearing enhancement apparatus as recited in claim 60 further comprising a microphone at least for receiving the audio sound in the environment of the apparatus.

62. A hearing enhancement apparatus as recited in claim 13, wherein at least a portion of the hearing enhancement apparatus is in a head-mounted electronic device.

63. A hearing enhancement apparatus as recited in 62, wherein the apparatus comprises a volume control that is configured to respond to a voice command.

64. A hearing enhancement apparatus as recited in 62, wherein the apparatus is configured to recognize at least a voice command from the user and operate according to the voice command.

65. A hearing enhancement apparatus as recited in claim 64, wherein the at least one hearing characteristic of the user is identified via measuring the user's hearing at least across a plurality of frequencies.

66. A hearing enhancement apparatus as recited in claim 65, wherein the hearing enhancement apparatus is configured to alter a power level of the audio output signals so as to suppress at least a sound level associated with the environment of the apparatus so as to provide noise cancellation.

67. A hearing enhancement apparatus as recited in claim 66 further comprising a microphone configured to receive audio sound at the environment of the apparatus for determining the sound level associated with the environment of the apparatus.

68. A hearing enhancement apparatus as recited in claim 67, wherein the apparatus is configured to wirelessly couple to a cell phone.

69. A hearing enhancement apparatus as recited in claim 68, wherein based on at least a preference of the user, the power of a first range of frequencies of the audio output signals is increased, and the power of a second range of frequencies of the audio output signals is not increased.

70. A hearing enhancement apparatus as recited in claim 64, wherein the hearing enhancement apparatus is configured to alter a power level of the audio output signals so as to suppress at least a sound level associated with the environment of the apparatus so as to provide noise cancellation.

71. A hearing enhancement apparatus as recited in claim 70 further comprising a microphone configured to receive audio sound at the environment of the apparatus for determining the sound level associated with the environment of the apparatus.

72. A hearing enhancement apparatus as recited in claim 71, wherein the apparatus is configured to wirelessly couple to a cell phone.

73. A hearing enhancement apparatus as recited in claim 72, wherein based on at least a preference of the user, the power of a first range of frequencies of the audio output signals is increased, and the power of a second range of frequencies of the audio output signals is not increased.

74. A hearing enhancement apparatus as recited in claim 73, wherein the at least one hearing characteristic of the user is identified via measuring the user's hearing at least across a plurality of frequencies.

75. A hearing enhancement apparatus as recited in 62, wherein the apparatus is configured to wirelessly couple to a cell phone.

76. A hearing enhancement apparatus as recited in 62, wherein based on at least a preference of the user, the power of a first range of frequencies of the audio output signals is increased, and the power of a second range of frequencies of the audio output signals is not increased.

77. A hearing enhancement apparatus as recited in 62, wherein the at least one hearing characteristic of the user is identified via measuring the user's hearing at least across a plurality of frequencies.

78. A hearing enhancement apparatus as recited in claim 77, wherein the hearing enhancement apparatus assists in measuring the user's hearing.

79. A hearing enhancement apparatus as recited in 62, wherein information regarding the at least one hearing characteristic of the user is wirelessly received and stored in the hearing enhancement apparatus.

80. A hearing enhancement apparatus as recited in 62, wherein information regarding the at least one hearing characteristic of the user is retrieved from a portable media storage device while the portable media storage device is physically and electrically connected to the apparatus.

81. A hearing enhancement apparatus as recited in 62, wherein the hearing enhancement apparatus is configured to alter a power level of the audio output signals so as to suppress at least a sound level associated with the environment of the apparatus so as to provide noise cancellation.

82. A hearing enhancement apparatus as recited in claim 81 further comprising a microphone configured to receive audio sound at the environment of the apparatus for determining the sound level associated with the environment of the apparatus.

* * * * *

UNITED STATES PATENT AND TRADEMARK OFFICE
CERTIFICATE OF CORRECTION

PATENT NO. : 8,582,789 B2
APPLICATION NO. : 12/157092
DATED : November 12, 2013
INVENTOR(S) : Cheung et al.

It is certified that error appears in the above-identified patent and that said Letters Patent is hereby corrected as shown below:

On Title page 2, Item (56) References Cited U.S. Patent Documents:

"6,895,261 B1   5/2005   Palamidies" should be --6,895,261 B1   5/2005   Palamides--.

In the Specification:

In column 13, please delete lines 32 to 52, the third and fourth full paragraphs.

Please insert at column 14, line 39, after the second full paragraph, the following:
--In one embodiment, signals driving a speaker in a system of the present invention can be modified based upon user information stored in the system. As such, the audio sound being produced by the speaker can be customized for (or personalized to) the user. For example, when the user information pertains to user preferences of the user, the audio output by the speaker is customized for the user preferences of the user.
   In one implementation, the measured sound (e.g. noise) levels at the vicinity of a user can be measured by a pickup device (e.g., microphone) at the vicinity of the user. The pickup device can be incorporated in an embodiment of the invention. For example, if the user is in an area with a lot of noise (e.g., ambient noise), such as at a confined space with various persons or where construction noise is present, signals received by the embodiment could be processed to attempt to suppress the unwanted noise. One approach to suppress the unwanted noise is to introduce audio outputs that are opposite in phase to the unwanted noise so as to cancel the noise. Noise suppression can be achieved through conventional digital signal processing, amplification and/or filtering techniques.--.

In the Claims:

Column 16, lines 66-67 (claim 23, lines 2-3) "configured to operate as a phone" should be --configured to operate as at least a part of a phone--.

Signed and Sealed this
Eleventh Day of March, 2014

Michelle K. Lee
*Deputy Director of the United States Patent and Trademark Office*

CERTIFICATE OF CORRECTION (continued)
U.S. Pat. No. 8,582,789 B2

Column 19, line 7 (claim 63, line 1) "as recited in 62" should be --as recited in claim 62--.

Column 19, line 10 (claim 64, line 1) "as recited in 62" should be --as recited in claim 62--.

Column 20, line 11 (claim 75, line 1) "as recited in 62" should be --as recited in claim 62--.

Column 20, line 14 (claim 76, line 1) "as recited in 62" should be --as recited in claim 62--.

Column 20, line 19 (claim 77, line 1) "as recited in 62" should be --as recited in claim 62--.

Column 20, line 26 (claim 79, line 1) "as recited in 62" should be --as recited in claim 62--.

Column 20, line 31 (claim 80, line 1) "as recited in 62" should be --as recited in claim 62--.

Column 20, line 36 (claim 81, line 1) "as recited in 62" should be --as recited in claim 62--.